(12) United States Patent
Kim et al.

(10) Patent No.: US 11,166,154 B2
(45) Date of Patent: Nov. 2, 2021

(54) NETWORK ACCESS METHOD OF TERMINAL, AND METHOD AND APPARATUS FOR MOBILITY SUPPORT AND DATA DELIVERY

(71) Applicant: Samsung Electronics Co., Ltd., Gyeonggi-do (KR)

(72) Inventors: Sunghoon Kim, Seoul (KR); Youngkyo Baek, Seoul (KR); Hoyeon Lee, Seoul (KR); Jungje Son, Gyeonggi-do (KR); Andrew Bennett, Surrey (GB)

(73) Assignee: Samsung Electronics Co., Ltd

( * ) Notice: Subject to any disclaimer, the term of this patent is extended or adjusted under 35 U.S.C. 154(b) by 43 days.

(21) Appl. No.: 16/623,209

(22) PCT Filed: Jun. 12, 2018

(86) PCT No.: PCT/KR2018/006657
§ 371 (c)(1),
(2) Date: Dec. 16, 2019

(87) PCT Pub. No.: WO2018/230941
PCT Pub. Date: Dec. 20, 2018

(65) Prior Publication Data
US 2021/0153006 A1    May 20, 2021

(30) Foreign Application Priority Data
Jun. 14, 2017 (KR) .................. 10-2017-0074772

(51) Int. Cl.
*H04W 8/24* (2009.01)
*H04W 8/08* (2009.01)
*H04W 48/16* (2009.01)

(52) U.S. Cl.
CPC ............. *H04W 8/245* (2013.01); *H04W 8/08* (2013.01); *H04W 48/16* (2013.01)

(58) Field of Classification Search
CPC ....... H04W 8/245; H04W 8/08; H04W 48/16; H04W 76/38; H04W 4/18; H04W 4/70;
(Continued)

(56) References Cited

U.S. PATENT DOCUMENTS

2011/0201343 A1   8/2011  Pinheiro et al.
2016/0050671 A1   2/2016  Yu et al.
(Continued)

FOREIGN PATENT DOCUMENTS

KR   1020180038304   4/2018
KR   1020180038324   4/2018
(Continued)

OTHER PUBLICATIONS

Huawei et al., "Solution for Key Issue #3: 1-15 Extended Buffering in 5GC", S2-181958, 3GPP TSG-SA WG2 Meeting #126, Feb. 26-Mar. 2, 2018, 4 pages.
(Continued)

*Primary Examiner* — Diane D Mizrahi
(74) *Attorney, Agent, or Firm* — The Farrell Law Firm, P.C.

(57) ABSTRACT

The present disclosure relates to a communication technique for convergence of IoT technology and a 5G communication system for supporting a higher data transfer rate beyond a 4G system, and a system therefor. The present disclosure can be applied to intelligent services (e.g., smart homes, smart buildings, smart cities, smart or connected cars, health care, digital education, retail business, and services associated with security and safety) on the basis of 5G communication technology and IoT-related technology. The present invention provides a method and an apparatus for buffering downlink data to a mobile initiated communication-only mode terminal.

15 Claims, 17 Drawing Sheets

(58) Field of Classification Search
CPC .. H04W 28/02; H04W 28/14; H04L 67/2861; H04L 69/28; H04L 67/12; H04L 67/2842
See application file for complete search history.

(56) References Cited

U.S. PATENT DOCUMENTS

| | | | |
|---|---|---|---|
| 2017/0127460 A1 | 5/2017 | Chandramouli et al. | |
| 2018/0115923 A1 | 4/2018 | Chandramouli et al. | |
| 2018/0270896 A1* | 9/2018 | Faccin | H04W 4/70 |
| 2018/0376384 A1* | 12/2018 | Youn | H04W 36/14 |

FOREIGN PATENT DOCUMENTS

| | | |
|---|---|---|
| WO | WO 2011/100570 | 8/2011 |
| WO | WO 2016/163998 | 10/2016 |

OTHER PUBLICATIONS

CATT: "Solution on Extended Buffering", S2-181524, SA WG2 Meeting #126, Feb. 26-Mar. 2, 2018, 2 pages.
NTT Docomo: "Solution 2 Update", S2-150870, SA WG2 Meeting #108, Apr. 13-17, 2015, 7 pages.
Alcatel-Lucent et al., "HLCOM Solution based on DL Buffering in SGW", S2-144597, SA WG2 Meeting #106, Nov. 17-21, 2014, 5 pages.
Nokia et al., "23.501 P-CR: DL Data Buffering in MICO Mode", S2-172271, SA WG2 Meeting #120, Mar. 27-31, 2017, 2 pages.
Nokia et al., "Use Case for UE Deregistration at the End of Communication", S2-172268, 3GPP TSG-SA WG2 Meeting #120, Mar. 27-31, 2017, 3 pages.
Qualcomm Incorporated, "TS 23.501: MM and SM Interactions for MICO UEs", S2-171710, SA WG2 Meeting #S2-120, Mar. 27-31, 2017, 5 pages.
European Search Report dated Mar. 26, 2020 issued in counterpart application No. 18818882.5-1231, 12 pages.
PCT/ISA/210 Search Report issued on PCT/KR2018/006657, pp. 5.
PCT/ISA/237 Written Opinion issued on PCT/KR2018/006657, pp. 5.
Kim, Junseok et al., "3GPP SA2 architecture and functions for 5G mobile communication system", ICT Express 3 (2017) 1-8, Apr. 13, 2017, pp. 9.
Techplayon, "5G Reference Network Architecture", http://www.techplayon.com/5g-reference-network-architecture, May 3, 2017, pp. 6.

* cited by examiner

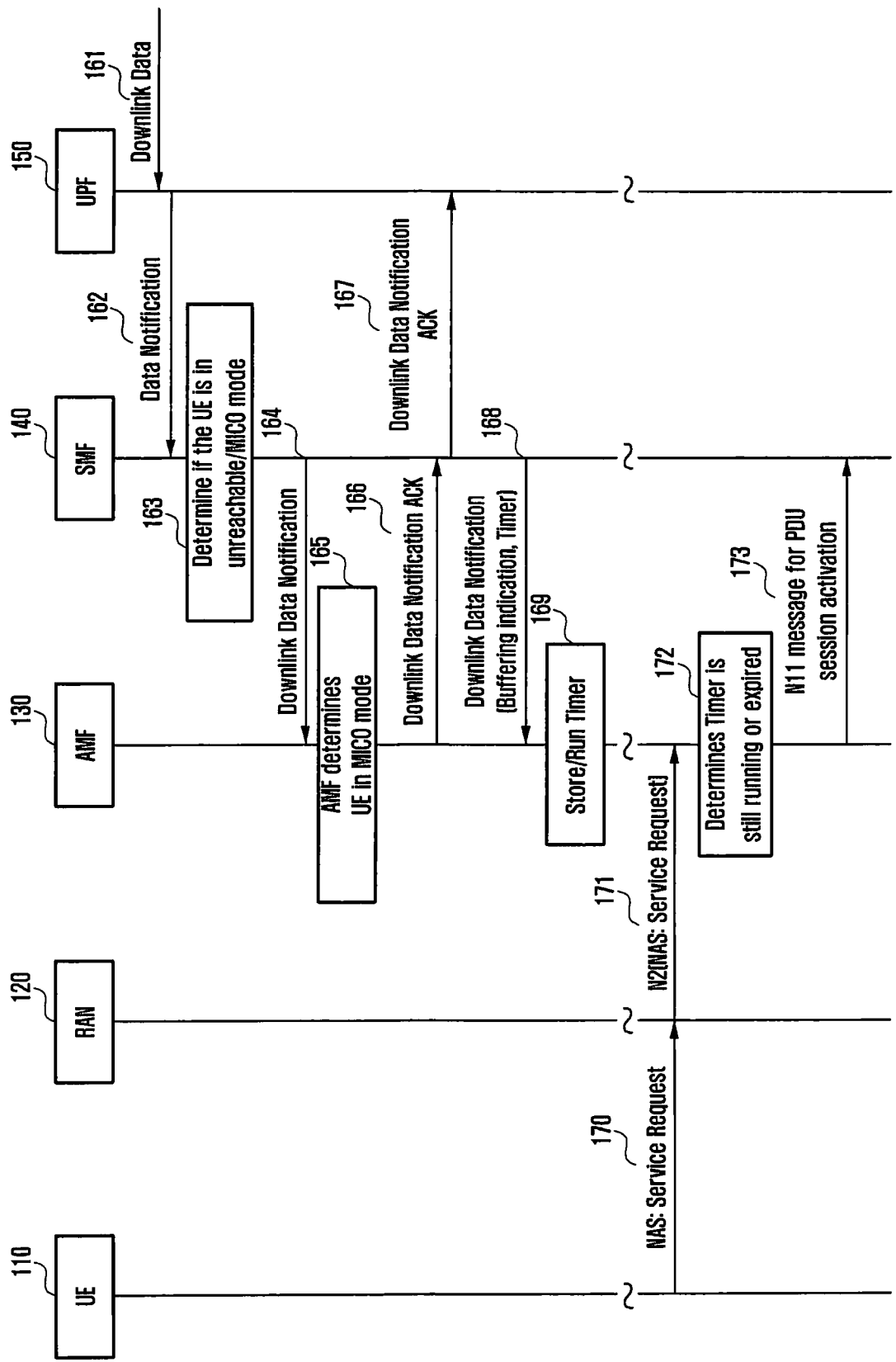

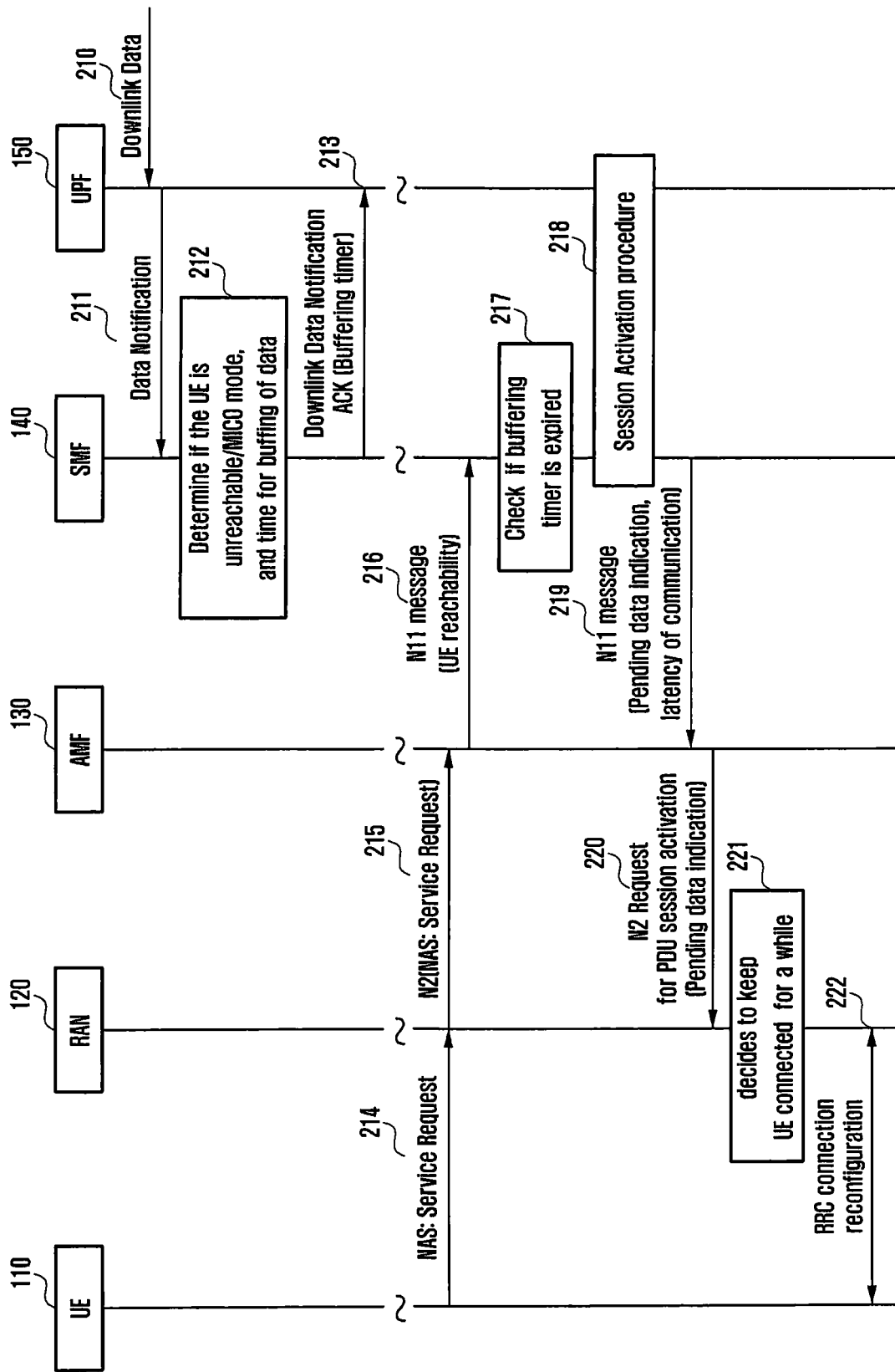

NETWORK ACCESS METHOD OF TERMINAL, AND METHOD AND APPARATUS FOR MOBILITY SUPPORT AND DATA DELIVERY

PRIORITY

This application is a National Phase Entry of PCT International Application No. PCT/KR2018/006657 which was filed on Jun. 12, 2018, and claims priority to Korean Patent Application No. 10-2017-0074772, which was filed on Jun. 14, 2017, the content of each of which is incorporated herein by reference.

TECHNICAL FIELD

The disclosure provides a method and an apparatus for buffering downlink data to a mobile initiated communication-only mode terminal.

BACKGROUND ART

To meet demands for radio data traffic that is increasing since commercialization of a fourth generation (4G) communication system, efforts to develop an improved fifth generation (5G) communication system or a pre-5G communication system have been conducted. For this reason, the 5G communication system or the pre-5G communication system is called a beyond 4G network communication system or a post long term evolution (LTE) system. To achieve a high data transmission rate, the 5G communication system is considered to be implemented in a super high frequency (mmWave) band (e.g., like 60 GHz band). To relieve a path loss of a radio wave and increase a transfer distance of the radio wave in the super high frequency band, in the 5G communication system, beamforming, massive multiple input/multiple output (MIMO), full dimensional MIMO (FD-MIMO), array antenna, analog beam-forming, and large scale antenna technologies have been discussed. Further, to improve a network of the system, in the 5G communication system, technologies such as evolved small cell, advanced small cell, cloud radio access network (cloud RAN), ultra-dense network, device to device communication (D2D), wireless backhaul, moving network, cooperative communication, coordinated multi-points (CoMP), and received interference cancellation have been developed. In addition, in the 5G system, hybrid frequency-shift keying (FSK) and quadrature amplitude modulation (QAM) modulation (FQAM) and sliding window superposition coding (SWSC) that are an advanced coding modulation (ACM) scheme and a filter bank multi carrier (FBMC), a non-orthogonal multiple access (NOMA), and a sparse code multiple access (SCMA) that are an advanced access technology, and so on have been developed.

Meanwhile, the Internet is evolving from a human-centric communication network in which information is generated and consumed by humans to the internet of things (IoT) network in which distributed components such as things exchange and process information. Internet of Everything (IoE) technology in which big data processing technology through connection with a cloud server, or the like is combined with the IoT technology also is emerging. In order to implement the IoT, technology elements such as the sensing technology, wired/wireless communication and network infrastructure, service interface technology, and security technology are required, thus, recent, research into the sensor network, machine to machine (M2M), and machine type communication (MTC) technologies for connection between things has been conducted. In the IoT environment, it is possible to provide an intelligent internet technology (IT) that is capable of collecting and analyzing data generated from connected things to create new values for human life. The IoT may be applied to various fields such as smart homes, smart buildings, smart cities, smart cars or connected cars, smart grids, health cares, smart appliances, and advanced medical services through existing information technology (IT) and fusion and convergence between various industries.

Thus, there are various attempts to apply the 5G communication system to the IoT network. For example, the sensor network, M2M, and MTC technologies are implemented by means of 5G communication technologies such as beamforming, MIMO, and array antenna. The application of the above-described cloud RAN as a big data processing technology is an example of convergence between the 5G technology and the IoT technology.

DISCLOSURE OF INVENTION

Technical Problem

MICO stands for Mobile Initiated Communication Only, and an MICO mode terminal refers to a terminal that connects to a network only when there is data to be sent by the terminal itself. In other words, when the MICO mode terminal is in an IDLE state, the MICO mode terminal does not perform an operation for receiving paging. Accordingly, the network cannot wake up the MICO mode terminal in the IDLE state, and can only determine that the corresponding terminal is reachable only when the MICO mode terminal wakes up and requests a connection to the network.

The disclosure provides a method for buffering downlink data for a MICO mode terminal in an SMF or a UPF and allocating a buffering timer to transmit downlink data to the MICO mode terminal so that the buffered data may be transmitted to the terminal when the terminal becomes reachable. In addition, the disclosure provides a method for managing buffering timers allocated by multiple SMFs in an AMF when an MICO mode terminal has the multiple SMFs and PDU sessions.

In addition, the disclosure defines a network slice consisting of network resources that can satisfy the requirements of each service in a 5G mobile communication. A mobile carrier may define a network slice specialized for each carrier. A user sends slice information to be used for 5G network access while causing the slice information to be included in a registration message. Accordingly, the disclosure provides a method for maintaining the security of slice information.

As to a method of efficiently managing a PDU session for non-3rd generation partnership project long term evolution (3gpp3gpp) which is previously generated when NW-triggered deregistration for non-3gpp3gpp access occurs in a situation where a terminal is connected to a 5G network through 3gpp access and non-3gpp access, there is a need for a management method for processing the PDU session in order to solve problems, such as a problem such that the PDU session is unnecessarily deleted even though a terminal can continue to receive the PDU session through the 3gpp access in a case where all the PDU sessions for the non-3gpp access are deleted according to deregistration in a 5G network, a problem such that unnecessary resources are used in the 5G network if the PDU session is not deleted even though deregistration may occur for the non-3gpp access, and the like.

In addition, this can be applied to a method of managing a PDU session for 3gpp which is previously generated when NW-triggered deregistration for 3gpp access occurs in a situation where a terminal is connected to a 5G network through 3gpp access and non-3gpp access. Thus, in the disclosure, only a case in which NW-triggered deregistration for non-3gpp access occurs will be addressed.

Solution to Problem

In accordance with an aspect of the disclosure, a communication method performed by a session management function (SMF) includes: receiving information indicating occurrence of downlink data from a user plane function (UPF); determining whether a terminal corresponding to the downlink data is a unreachable terminal or whether the terminal is a mobile initiated communication only (MICO) mode terminal; determining a buffering time to buffer the downlink data in case that the terminal is the unreachable terminal or the terminal is the MICO mode terminal; and transmitting information about the buffering time to at least one of an access and mobility management function (AMF) and the UPF.

Also, the determining whether the terminal is the unreachable terminal or whether the terminal is the MICO mode terminal may include: transmitting information about occurrence of the downlink data to the AMF, receiving, from the AMF, at least one of information indicating that the terminal is the unreachable terminal and information indicating that the terminal is the MICO mode terminal, and determining whether the terminal is the unreachable terminal or whether the terminal is the MICO mode terminal, based on the information received from the AMF.

Also, the communication method of the SMF may further include performing a connection activation procedure with the UPF and the terminal in case that the SMF receives, from the AMF, information indicating that the terminal is reachable, according to a service request of the terminal before the buffering time expires.

Also, the communication method of the SMF may further include receiving, from the AMF, information indicating that the terminal is reachable according to a service request of the terminal, determining whether the buffering time expires, and performing a connection activation procedure with the UPF and the terminal in case that the buffering time does not expire.

Also, the performing the connection activation procedure with the UPF and the terminal may include transmitting, to the AMF, a message for session establishment including information indicating that the downlink data is pending.

In accordance with another aspect of the disclosure, a communication method of an AMF includes: receiving information indicating occurrence of downlink data from an SMF; determining whether a terminal corresponding to the downlink data is an unreachable terminal or whether the terminal is an MIMO mode terminal; transmitting, to the SMF, at least one of information indicating that the terminal is the unreachable terminal and information indicating that the terminal is the MIMO mode terminal; and receiving, from the SMF, information about a buffering time to buffer the downlink data.

Also, the communication method of the AMF may further include receiving a service request message from the terminal; determining whether the buffering time expires; and transmitting information indicating that the terminal is reachable to the SMF in case that the buffering time does not expire.

Also, the communication method of the AMF may further include receiving, from the SMF, a message for session establishment including information indicating that the downlink data is pending.

In accordance with another aspect of the disclosure, a communication method of an SMF includes: a transceiver; and a controller configured to be connected to the transceiver, to receive information indicating occurrence of downlink data from a UPF, to determine whether a terminal corresponding to the downlink data is an unreachable terminal or whether the terminal is an MICO mode terminal, to determine a buffering time to buffer the downlink data in case that the terminal is the unreachable terminal or the terminal is the MICO mode terminal, and to transmit information about the buffering time to at least one of an AMF and the UPF.

In accordance with another aspect of the disclosure, an AMF includes: transceiver; and controller configured to be connected to the transceiver, to receive information indicating occurrence of downlink data from an SMF, to determine whether a terminal corresponding to the downlink data is an unreachable terminal or whether the terminal is an MICO mode terminal, to transmit at least one of information indicating that the terminal is the unreachable terminal and information indicating that the terminal is the MICO mode terminal to the SMF, and to receive information about a buffering time to buffer the downlink data from the SMF.

Advantageous Effects of Invention

A mobile communication service provider according to an embodiment may support delayed traffic transmission for each service used by a terminal or according to a request of an application server providing services to the terminal. An MICO mode terminal is suitable for terminals requiring low power communication, and as a result, the MICO mode terminal connects to a network to perform communication only when there is data to be transmitted by the terminal itself. However, when traffic for the corresponding terminal is transmitted according to the service or the request of the application server, the traffic may be transmitted while expecting a specific delay time. For example, the terminal may transmit "low priority" data to which the terminal can respond after 10 minutes or an hour without having to respond immediately. This is commonly called high latency data communication. Delayed traffic transmission may occur due to the congestion of a user plane function regardless of specific service characteristics or AS requests. For example, if the user plane function is congested, there may be a time delay when response data to data transmitted by a terminal is transmitted. If the terminal returns to an IDLE mode during this delay, the corresponding network cannot wake up the MICO mode terminal and transmit the response data. Accordingly, as an effect according to the embodiment, the network buffers downlink traffic for the MICO mode terminal for a specific time with respect to a service or traffic that is expected to be delayed, and maintains, when the terminal is reachable, the wireless connection of the terminal a little longer, and therefore a data communication service can be provided without loss of traffic delivered to the terminal.

In addition, according to an embodiment, it is possible to maintain the security of slice information used by the terminal.

In addition, through an embodiment, a terminal can propose a NW triggered de-registration scheme for non-3gpp access and efficiently manage a PDU session for non-3gpp access, thereby efficiently managing resources in a 5G network.

BRIEF DESCRIPTION OF DRAWINGS

FIGS. 1A and 1B are drawings illustrating a procedure in which an SMF buffers downlink data for an MICO mode terminal and transmits a timer thereof to an AMF and the AMF manages the timer and transmits a pending data indication to a RAN node when the terminal wakes up.

FIG. 2 is a diagram illustrating a procedure in which an SMF buffers downlink data for an MIMO mode terminal, receives a notification from an AMF that the terminal becomes reachable, and then notifies the AMF of the existence of the buffered data so that the AMF transmits a pending data indication to a RAN node.

MODE FOR THE INVENTION

Figure 1B:
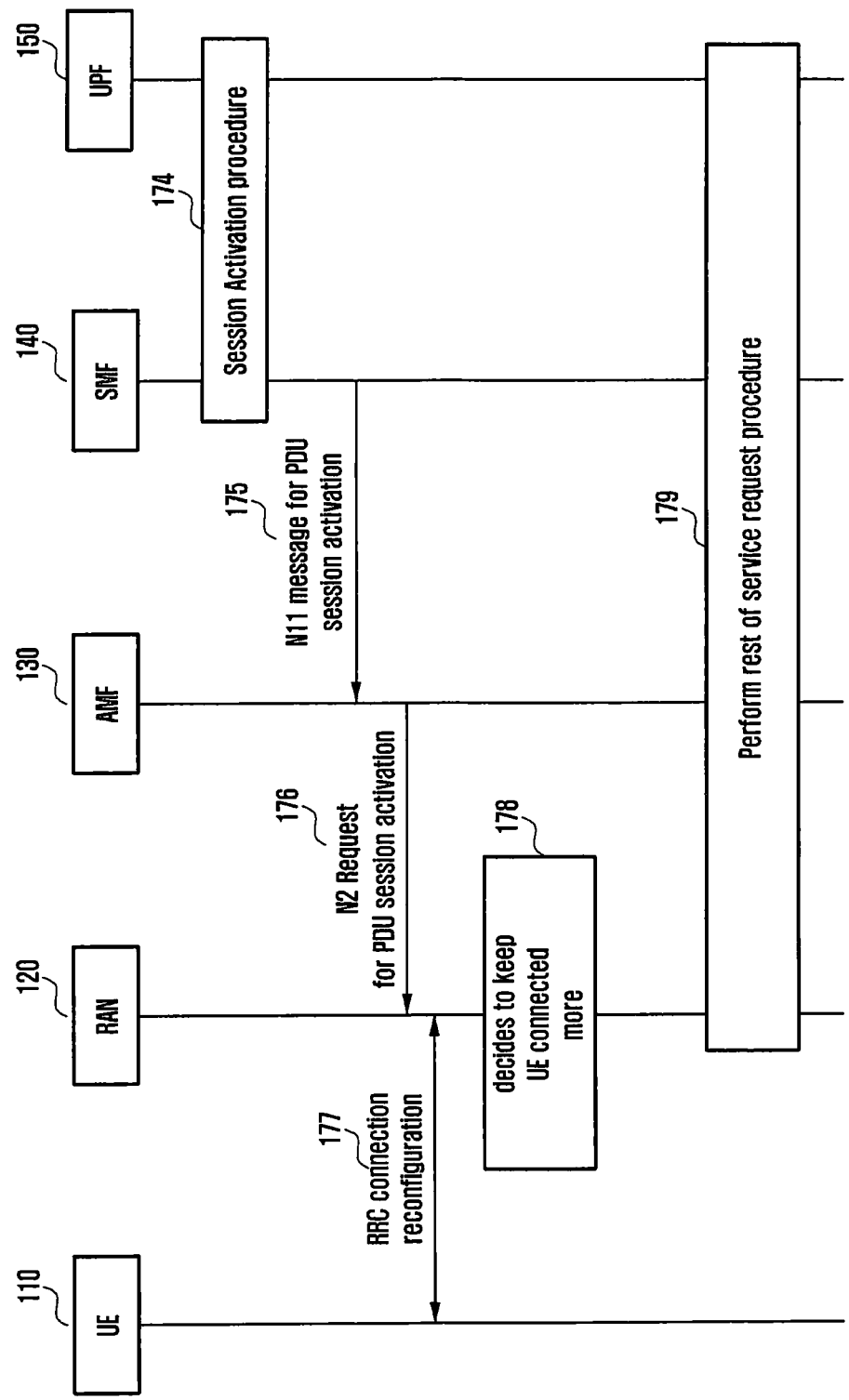

Hereinafter, embodiments of the disclosure will be described in detail with reference to the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card.

Hereinafter, an embodiment of the disclosure will be described in detail with reference to the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

Further, the detailed description of embodiments of the disclosure is made mainly based on a wireless communication system based on OFDM, particularly 3gpp EUTRA standard, but the subject matter of the disclosure can be applied to other communication systems having a similar technical background and channel form after a little modification without departing from the scope of the disclosure and the above can be determined by those skilled in the art.

Hereinafter, the operating principle of the disclosure will be described in detail with reference to the accompanying drawings. In describing the disclosure below, a detailed description of related known configurations or functions incorporated herein will be omitted when it is determined that the detailed description thereof may unnecessarily obscure the subject matter of the disclosure. The terms which will be described below are terms defined in consideration of the functions in the disclosure, and may be different according to users, intentions of the users, or customs. Therefore, the definitions of the terms should be made based on the contents throughout the specification. Terms for identifying an access node, terms referring to network entities, terms referring to messages, terms referring to an interface between network entities, terms referring to various identification information, and the like used in the following description are exemplified for convenience of explanation. Therefore, the disclosure may not be limited by the terminologies provided below, and other terms that indicate subjects having equivalent technical meanings may be used.

Detailed description of embodiments will be made mainly based on a wireless access network in which 5G network standard is defined by 3gpp, a new RAN (NR) which is a core network, and a packet core (5G system core network or 5G CN for short). However, the subject matter of the disclosure may also be applied to other communication systems having a similar technical background after a little modification without departing from the scope of the disclosure, and this may be determined by those skilled in the art.

Hereinafter, for convenience of explanation, some terms and names defined in a 3rd generation partnership project long term Evolution (3gpp) standard may be used. However, the disclosure is not limited by the terms and names, and may be identically applied to systems according to different standards.

A terminal (or user equipment (UE)) according to the embodiment may be specialized as a terminal for Internet of Things (IoT), and may be usefully used for a terminal having a communication function requiring low power.

First Embodiment

Description for entities described in the disclosure is provided as follows.

A terminal is connected with a RAN and accesses an apparatus performing a mobility management function of a core network apparatus of 5G. In the disclosure, the apparatus is called an access and mobility management function (AMF). This may refer to a function or an apparatus in charge of both of an access of the RAN and the mobility management of the terminal. The AMF serves to route a session-related message for the terminal to an SMF. The AMF is connected with the SMF, and the SMF is connected with a user plane function (UPF) and allocates a user plane resource to be provided to the terminal to establish a tunnel for transmitting data between a base station and the UPF.

MICO stands for mobile initiated communication only, and an MICO mode terminal refers to a terminal that connects to a network only when there is data to be transmitted by the terminal itself. In other words, when the MICO mode terminal is in an IDLE state, the MICO mode terminal does not receive an operation for receiving paging. Accordingly, the network cannot wake up the MICO mode terminal in the IDLE state, and can determine that the terminal is reachable only when the MICO mode terminal wakes up and requests a connection to the network. For example, in a case in which there is a characteristic that a response delay time may be long (delay tolerance) as one of the characteristics of IoT traffic, if an IoT terminal using the MICO mode transmits traffic and returns to the IDLE mode while waiting for a response thereto, delayed response traffic transmitted by an application server cannot be transmitted to the terminal. As another example, in a case where there is a characteristic that a data transmission delay time may be long (high latency communication) as one of the characteristics of IoT traffic, the corresponding data cannot be immediately transmitted due to the unreachable MICO mode terminal although the application server transmits traffic to the IoT terminal using the MICO mode, and can be buffered until the terminal becomes reachable, and then traffic can be transmitted.

Therefore, the disclosure proposes a method in which data for an MICO mode terminal is buffered in a 5G core network and an SMF notifies an AMF of a time value to be buffered when there is buffered data (or when the buffered data is high latency communication or delay tolerant). Because of this, when the terminal becomes reachable through registration update or service request, the disclosure proposes a method in which the AMF transmits a pending data indication to a RAN node so that the wireless connection of the terminal can be maintained in a connected state for a longer time than usual. As another example, the disclosure proposes a method in which data for an MICO mode terminal is buffered in a 5G core network, an SMF notifies a UPF to buffer specific time data when there is buffered data (or when the buffered data is high latency communication or delay tolerant), and then, in a case in which the terminal becomes reachable through registration update or service request, when the AMF notifies the SMF of the reachability of the terminal, a pending data indication is transmitted to a RAN node so that the wireless connection of the terminal can be maintained in a connected state for a longer time than usual. As another example, the application server may set a communication pattern of a specific terminal through a network exposure function (NEF). For example, information indicating that a service provided to the specific terminal has a characteristic of delayed communication, time when the specific terminal should perform data communication, how long data communication is performed at the time of the start of the data communication, and the like may be transmitted to a 5G core network function. After receiving the above information, the SMF may use the provided information to determine a data buffering time for the terminal. If the terminal is provided with a value of waking up every 30 minutes to perform data communication, the terminal may keep the UPF buffering data for the terminal for 30 minutes.

In the disclosure, data transmission is taken as an example, but a service such as an SMS may be included as an example of data transmission. Alternatively, the data transmission may include even a service for transmitting and receiving data to determine location information of a terminal.

First Embodiment—FIGS. 1A and 1B

FIGS. 1A and 1B are drawings illustrating a procedure in which an SMF informs an AMF of a buffering time of data for an MICO UE and the AMF executes the timer to determine whether there is pending data in a terminal and to inform a RAN node of the determination result.

In the background of the disclosure, a terminal 110 and an AMF 130 negotiate whether to use an MICO mode during a registration procedure. The terminal 110 requests for the MICO mode from the AMF 130, and the AMF 130 should permit an MICO mode operation for the terminal 110 so that the terminal 110 can operate in the MICO mode. The terminal 110, which is authorized to operate in the MICO mode, enters an IDLE state after a predetermined time. In this state, the terminal 110 may not monitor a paging channel and thus may not say that a paging operation is not performed. When data to be transmitted by the MICO mode terminal 110 is generated, the terminal 110 notifies a non-access stratum (NAS) layer of the terminal 110 that data communication is required, and the NAS layer configures a service request message. The terminal 110 transmits the service request message to the AMF 130 to activate a protocol data unit (PDU) session required for the data communication. When the AMF 130 receives the service request transmitted by the terminal 110, the AMF 130 determines that the terminal 110 is reachable. The AMF 130 determines that the received service request has arrived from the MICO mode terminal 110, and then notifies the SMF 140 of the reachability of the terminal 110. Thereafter, the SMF 140 performs a PDU session activation procedure with the UPF 150 according to the position of the terminal 110. After completing the PDU session activation operation, the SMF 140 transmits a message for establishing a data radio bearer to a base station 120 through the AMF 130. This means a message transmitted by the AMF 130 to the RAN node 120 in order to produce a path for data transmission with respect to the terminal 110.

When downlink data for the terminal 110 arrives from an external network (not shown) in operation 161, the UPF 150 notifies the SMF 140 of the arrival of the downlink data in operation 162. In operation 162, the SMF 140 receives a downlink data notification from the UPF 150, and in operation 163, the SMF 140 determines whether the corresponding terminal 110 is unreachable or whether the corresponding terminal 110 is an MICO mode terminal. The SMF 140 determines whether the corresponding terminal 110 is unreachable or whether the corresponding terminal 110 is in the MICO mode, based on a value informed to the SMF 140 by the AMF 130 due to the use of the MICO mode by the terminal 110. When the SMF 140 does not determine whether the terminal 110 is unreachable or whether the terminal 110 is in the MICO mode, in operation 164, the SMF 140 notifies the AMF 130 of the arrival of the downlink data. In operation 165, the AMF 130 determines whether the corresponding terminal 110 is in the MICO mode based on a message at operation 164 received from the SMF 140. The AMF 130 determines that the terminal 110 is in the MICO mode, and transmits, to the SMF 140, a message (e.g., downlink data notification ACK) of operation 166 which is a response to the message at operation 164, and notifies the SMF 140 that the terminal 110 is unreachable or that the terminal 110 is in the MICO mode in operation 166. According to an embodiment, the SMF 140 that has received the message at operation 166 identifies that the terminal 110 is unreachable or that the terminal 110 is in the MICO mode, and then determines how long the downlink data for the corresponding terminal 110 is to be buffered. This buffering time may be a value set inside the SMF 140, or may be determined in consideration of a value requested from an external server according to a third embodiment to be described later. Alternatively, the buffering time may be determined based on the congestion of the UPF 150. According to an embodiment, the SMF 140, which has determine to buffer the downlink data for the MICO mode terminal 110 for a specific time as described above, transmits a message at operation 167 to the UPF 150 so that a corresponding downlink packet may be buffered for a specific time. According to an embodiment, the SMF 140 transmits a message at operation 168 to the AMF 130 to notify the terminal 110 of an identifier indicating that the arrived downlink data is to be buffered, and transmits a value for a buffering timer indicating how long buffering is to be performed, together. Alternatively, the SMF 140 may transmit only the buffering timer to the AMF 130. In this case, since the AMF 130 has received the buffering timer, it can be seen that buffering will be performed on the corresponding packet. According to an embodiment, in operation 169, the AMF 130 receiving the message executes a timer according to the timer value included in the message. This timer is a timer running for the terminal 110.

According to a detailed embodiment, when the SMF 140 receives another downlink data for the terminal 110 as described above (for example, receives downlink data for another PDU session, or another example, receives additional downlink data for the same PDU session), the SMF 140 may determine the buffering timer for the corresponding down link data again. Accordingly, the SMF 140 may transmit a buffering timer for a newly added message to the AMF 130 as in the message at operation 168. The AMF 130 that has received the buffering timer may update the executed timer. The buffering timer newly transmitted by the SMF 140 may be shorter or longer than the previous buffering timer. The AMF 130 executes the timer again based on the newly received timer, regardless of the remaining value of the previously received and executed timer. Alternatively, if the remaining value of the previously received and executed timer is greater than the value of the newly received timer, the AMF 130 may continue to run the remaining timer.

The time passes, and the terminal 110 wakes up and transmits a service request to the AMF 130 in operations 170 and 171. The AMF 130 that has received the service request determines that the terminal 110 becomes reachable. According to an embodiment, in operation 172, the AMF 130 determines whether the buffering timer previously received from the SMF 140 is still executed or has expired. If the buffering timer is still executed, the AMF 130 determines that there is downlink pending data to be transmitted to the terminal 110. If the timer has expired, the AMF 130 determines that the pending data to be transmitted to the terminal 110 has already been discarded. In operation 173, the AMF 130 notifies the SMF 140 associated with the PDU session used by the terminal 110 that the terminal 110 becomes reachable. In operation 174, the SMF 140 that has received this performs a PDU session activation procedure for the terminal 110 with the UPF 150. In operation 175, the SMF 140 that has performed the PDU session activation with the UPF 150 transmits an N11 message to the AMF 140 to establish a connection between the base station 120 and the UPF 150 (N11 is an interface name between the AMF 130 and the SMF 140). This message includes a message for establishing a session between the base station 120 and the UPF 150. According to an embodiment, in a case where it is determined that there is the pending data for the terminal 110 in operation 172, when a session establishment-related message at operation 175 is included in a message at operation 176 and transmitted to the base station 120, the AMF 130 may transmit a pending data indication to maintain the wireless resource of the terminal 110 longer because there is data to be transmitted to the terminal. The base station 120 may transmits a message at operation 177 to the terminal 110 to complete the establishment of the PDU session among the terminal 110, the base station 120, and the UPF 150. In operation 176, the base station 120 that has received the pending data indication may operate to determine inactivity for a longer time than usual when determining wireless resource inactivity of the terminal 110 in operation 178. Therefore, even if the terminal 110 does not use the wireless resources for a longer period of time, the terminal 110 may maintain the wireless resources without releasing them. Thereafter, in operation 179, the base station 120, the AMF 130, the SMF 140, and the UPF 150 perform the remaining service request procedure.

Second Embodiment—FIG. 2

FIG. 2 is a diagram illustrating a procedure in which an SMF determines a buffering time of data for an MICO UE and informs a UPF of the determined buffering time, and an AMF determines whether there is downlink pending data for a terminal when the AMF informs the SMF that the terminal is reachable and informs the determination result.

In the background of the disclosure, the terminal 110 and the AMF 130 negotiate whether to use an MICO mode during a registration procedure. The terminal 110 requests for the MICO mode from the AMF 130, and the AMF 130 should permit an MICO mode operation for the terminal 110 so that the terminal 110 can operate in the MICO mode. The terminal 110, which is authorized to operate in the MICO mode, enters an IDLE state after a predetermined time. In this state, the terminal 110 may not monitor a paging channel and thus may not say that a paging operation is not performed. When data to be transmitted by the MICO mode terminal 110 is generated, the terminal 110 notifies a NAS layer of the terminal 110 that data communication is required, and the NAS layer configures a service request message. The terminal 110 transmits the service request message to the AMF 130 to activate a PDU session required for the data communication. When the AMF 130 receives the service request transmitted by the terminal 110, the AMF 130 determines that the terminal 110 is reachable. The AMF 130 determines that the received service request has arrived from the MICO mode terminal 110, and then notifies the SMF 140 of the reachability of the terminal 110. Thereafter, the SMF 140 performs a PDU session activation procedure with the UPF 150 according to the position of the terminal 110. After completing the PDU session activation operation, the SMF 140 transmits a message for establishing a data radio bearer to the base station 120 through the AMF 130. This means a message transmitted by the AMF 130 to the RAN node 120 in order to produce a path for data transmission with respect to the terminal 110.

When downlink data for the terminal 110 arrives from an external network (not shown) in operation 210, the UPF 150 notifies the SMF 140 of the arrival of the downlink data in operation 211. In operation 211, the SMF 140 receives a downlink data notification from the UPF 150, and in operation 212, the SMF 140 determines whether the corresponding terminal 110 is unreachable or whether the corresponding terminal 110 is an MICO mode terminal. The SMF 140 determines whether the corresponding terminal 110 is unreachable or whether the corresponding terminal 110 is in the MICO mode, based on a value informed to the SMF 140 by the AMF 130 due to the use of the MICO mode by the terminal 110. In operation 212, the SMF 140 determines that the terminal 110 is unreachable or that the terminal 110 is in the MICO mode. In operation 213, the SMF 140 that has determined that the terminal 110 is unreachable or that the terminal 110 is in the MICO mode requests the UPF 150 to buffer the corresponding downlink data, and transmits a buffering timer value for how long the buffering is to be performed. The UPF 150 that has received this buffers a corresponding downlink packet during the received buffering timer. The SMF 140 may execute this timer to determine how long the downlink data for the terminal 110 is to be buffered.

The time passes, and the terminal 110 wakes up and transmits a service request to the AMF 130 in operations 214 and 215. The AMF 130 that has received the service request determines that the terminal 110 becomes reachable. In operation 216, the AMF 130 notifies the SMF 140 associated with the PDU session used by the terminal 110 that the terminal 110 becomes reachable. In operation 217, the SMF 140 that has received this determines whether the buffering timer for the terminal 110 has expired. When the buffering timer has expired, the SMF 140 determines that the UPF 150 deletes the data buffered by the UPF 150. When the buffering timer has not expired, the SMF 140 determines that downlink data to be transmitted to the terminal 110 is pending. Based on this determination, the SMF 140 performs operation 219. First, in operation 218, the SMF 140 performs a PDU session activation procedure for the terminal 110 with the UPF 150. In operation 219, the SMF 140 that has performed the PDU session activation with the UPF 150 transmits an N11 message to the AMF 140 to establish a connection between the base station 120 and the UPF 150 (N11 is an interface name between the AMF 130 and the SMF 140). This message includes a message for establishing a session between the base station 120 and the UPF 150. According to an embodiment, when the SMF 140 transmits a message at operation 219 to the AMF 130, the message may include an identifier indicating that the downlink data to be transmitted to the terminal 110 is buffered or pending. This can be called a pending data indication or a buffering indication. In another embodiment, the SMF 140 may transmit an identifier indicating that the message to be transmitted to the terminal 110 has a high latency communication characteristic or a delay tolerant characteristic. The identifier may be an identifier indicating traffic that the terminal 110 communicates is traffic with a long delay time or should be transmitted with a long delay time. Alternatively, the identifier may be information representing a time value other than an identifier type. The above information may be a value set according to the third embodiment. The AMF 130 that has received the message at operation 219 may determine that downlink data to be transmitted to the terminal 110 is pending. Therefore, when the AMF 130 transmits a session establishment-related message to the base station 120 while allowing the session establishment-related message to be included in a message at operation 220, the AMF 130 may transmit a pending data indication to maintain the wireless resource of the terminal 110 longer because there is data to be transmitted to the terminal 110. According to a detailed embodiment, the AMF 130 may include "traffic delay time of the terminal or the identifier for traffic transmission characteristics" received from the message at operation 219 or a time value in the message at operation 220, and may transmit the corresponding message to the base station 120. In operation 221, the base station 120 that has received the pending data indication in operation 220 may operate to determine wireless resource inactivity for a longer time than usual when determining the wireless resource inactivity of the terminal 110. This may be based on a time value received in operation 220. Therefore, even if the terminal 110 does not use the wireless resources for a longer period of time, the wireless resources of the terminal 110 may be maintained without being released. The base station 120 completes the establishment of the PDU session among the terminal 110, the base station 120, and the UPF 150 by transmitting a message at operation 222 to the terminal 110. Thereafter, the base station 120, the AMF 130, the SMF 140, and the UPF 150 perform the remaining service request procedure and transmit the downlink data to the terminal 110.

Third Embodiment

An application server (AS) in a 3rd party may configure the communication pattern of the corresponding terminal 110 in a 5G network with respect to the terminal 110 to which a service is provided by the AS itself, according to the characteristics of the service. The communication pattern may contain the following information:
Communication schedule of terminal: for example, Monday 9:10, November 11 11:11, etc.
Communication delay of terminal: traffic delay applied when AS provides service to terminal, for example, 2 seconds, 1 second, 200 milliseconds, etc.
Communication during which terminal performs communication: every 30 minutes, every hour, etc.
The 3rd party application server transmits a request for configuring the above-described communication pattern for the specific terminal 110 through a network exposure function (NEF). The request message includes an identifier for the terminal 110. In addition, a DNN value used by the terminal 110 to communicate with the application server may be included in the request message.

The NEF that has received the request finds an SMF 140 serving the requested terminal 110. Then, in an embodiment, the requested communication pattern is delivered to the SMF 140 serving the corresponding terminal 110. In the disclosure, this is called a communication pattern provisioning request for convenience. In another embodiment, this message is not transmitted directly to the SMF 140 from the NEF. That is, the NEF is configured as subscription information of the terminal 110 in a user data management (UDM, corresponding to the role of HSS in the past), and then the UDM notifies the SMF 140 of the context update of the terminal 110, so that the communication pattern can be transmitted to the SMF 140.

The SMF 140 configures a buffering timer value for the corresponding terminal 110 after receiving the communication pattern information. Thereafter, the same procedure as in FIGS. 1 and 2 of the disclosure is performed.

Second Embodiment

In describing the embodiments, a slice, a service, a network slice, a network service, an application slice, an application service, and the like may be used interchangeably.

Figure 3:
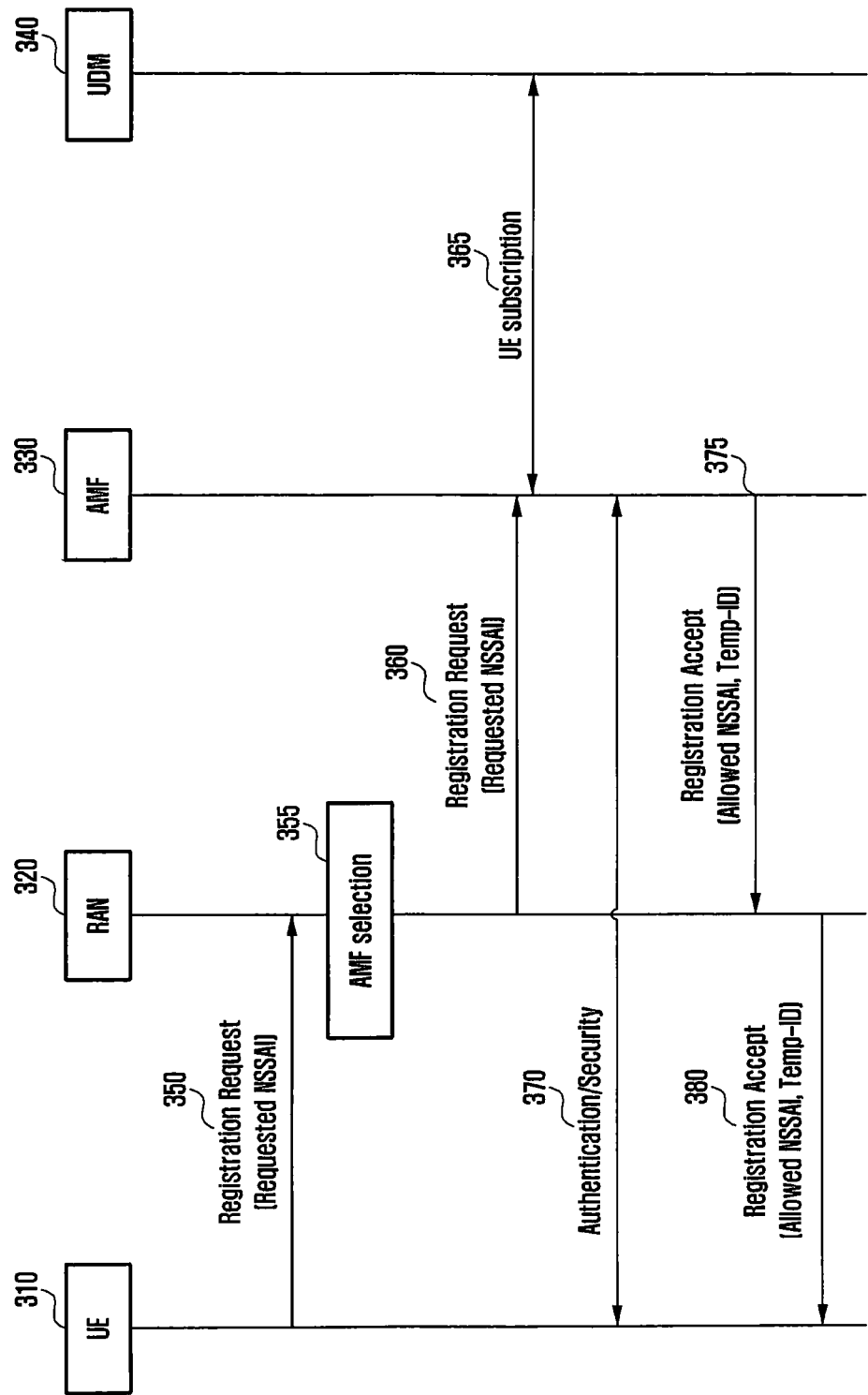
FIG. 3 is a diagram illustrating a registration procedure according to an embodiment.

When a terminal is connected to a 5G mobile communication network, the terminal may include slice information to be used after the connection in a registration message and may transmit the corresponding information. FIG. 3 illustrates an initial network connection registration procedure. In operation 350, a terminal 310 includes requested network slice selection assistance information (NSSAI) that is slice information to be used, in a registration request message, and transmits the corresponding information to a RAN 320. The RAN 320 that has received the registration request message selects the AMF 330 capable of supporting the requested NSSAI in operation 355, and forwards the message at operation 360. The AMF 330 that has received the registration request message obtains subscriber information (UE subscription) of the terminal 310 from the UDM 340 in operation 365. The AMF 330 that has received UE subscription information obtains an allowed NSSAI. As to a method of determining the allowed NSSAI, the allowed NSSAI may be determined based on the requested NSSAI received from the terminal 310, the subscriber information of the terminal, the policy of the mobile operator, and slice information available at the current terminal location. A network function for determining the allowed NSSAI may be performed by the AMF 330, a network slice selection function (NSSF), or a network repository function (NRF). If the NSSF or the NRF determines the allowed NSSAI, the AMF 330 communicates with the NSSF (not shown) or the NRF (not shown) to obtain the allowed NSSAI information after operation 365. The AMF 330 that has obtained the subscription information of the terminal 310 authenticates the terminal 330 in operation 370 and performs a security setup. After operation 370, messages transmitted and received between the terminal 310 and the AMF 330 and between the terminal 310 and the RAN 320 are (integrity protected NAS and confidentiality protected) messages with guaranteed security. The AMF 330 allocates a temporary ID (Temp-ID), which is a temporary identifier used by the terminal 310 to access a network. The AMF 330 may transmit a registration acceptance message allowing the registration of the terminal 310 to the terminal 310 through operations 375 and 380. The registration acceptance message may include the allowed NSSAI information and the Temp-ID. That is, the messages at operations 375 and 380 are messages with guaranteed security.

In this manner, FIG. 3 illustrates a message flow including the requested NSSAI in the registration request in operation 350. FIG. 3 may apply to (1) case in which the terminal 310 and the AMF 330 have already performed a security setup to secure the registration request in operation 350, or (2) a slice that does not require security even if the message at operation 350 is not guaranteed. Hereinafter, FIGS. 4 to 9 illustrate a method of not including the requested NSSAI when security of the registration request at operation 350 is not guaranteed.

Figure 4:
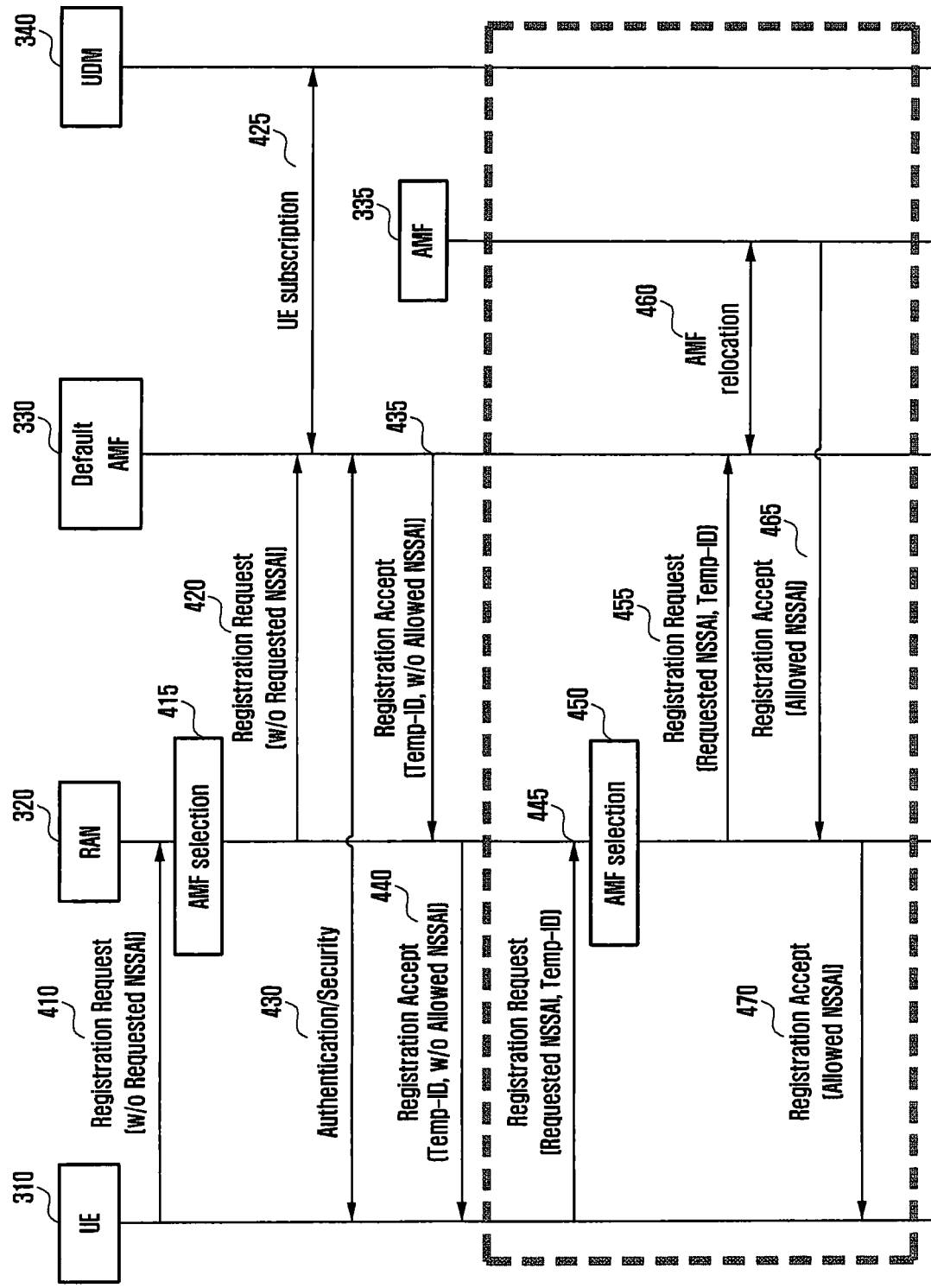
FIG. 4 is a diagram illustrating a two-operation registration procedure including a temporary ID according to an embodiment.

FIG. 4 is a diagram illustrating a two-operation registration procedure including a temporary ID according to an embodiment. That is, operations 410 to 440 are the same as operations 350 to 380 described with reference to FIG. 3. However, in operation 410, the terminal 310 transmits a registration request message to the RAN 320 without including the requested NSSAI. The AMF 330 that does not receive the requested NSSAI does not acquire the allowed NSSAI, and even in operations 435 and 440, the allowed NSSAI is not included. Through this process, in operation 430, the terminal 310 that has performed security setup transmits the registration request message to the RAN 320 in operation 445 and includes the requested NSSAI. At this time, the Temp-ID allocated in the previous registration process is included. In operation 450, the RAN 320 selects the AMF 330 associated with the Temp-ID based on the Temp-ID and forwards a message. In operation 455, the AMF 330 that has received the requested NSSAI acquires the allowed NSSAI. As to a method of determining the allowed NSSAI, the allowed NSSAI may be determined based on the requested NSSAI received from the terminal 310, subscriber information of the terminal 310, the policy of the mobile operator, and slice information available at the current terminal location. A network function for determining the allowed NSSAI may be performed by the AMF 330, a NSSF, or a NRF. If the NSSF or the NRF determines the allowed NSSAI, the AMF 330 communicates with the NSSF or the NRF to obtain the allowed NSSAI information after operation 455. The AMF 330 itself that has acquired the allowed NSSAI determines whether to support S-NSSAIs included in the allowed NSSAI, and forwards the corresponding message to another AMF 335 that can support the S-NSSAIs included in the allowed NSSAI in operation 460 when the S-NSSAIs cannot be supported. When the current AMF 330 can support the S-NSSAIs included in the allowed NSSAI, operation 460 is not performed and the message at operation 465 is transmitted by the default AMF 330. In operations 465 and 470, the AMFs 330 and 335 transmit a registration acceptance message for informing the terminal 310 of successful registration, and the allowed NSSAI is included in the corresponding message. If the new AMF 335 allocates anew Temp-ID to the terminal 310, Temp-IDs newly assigned in operations 465 and 470 may be also included and transmitted.

Figure 5:
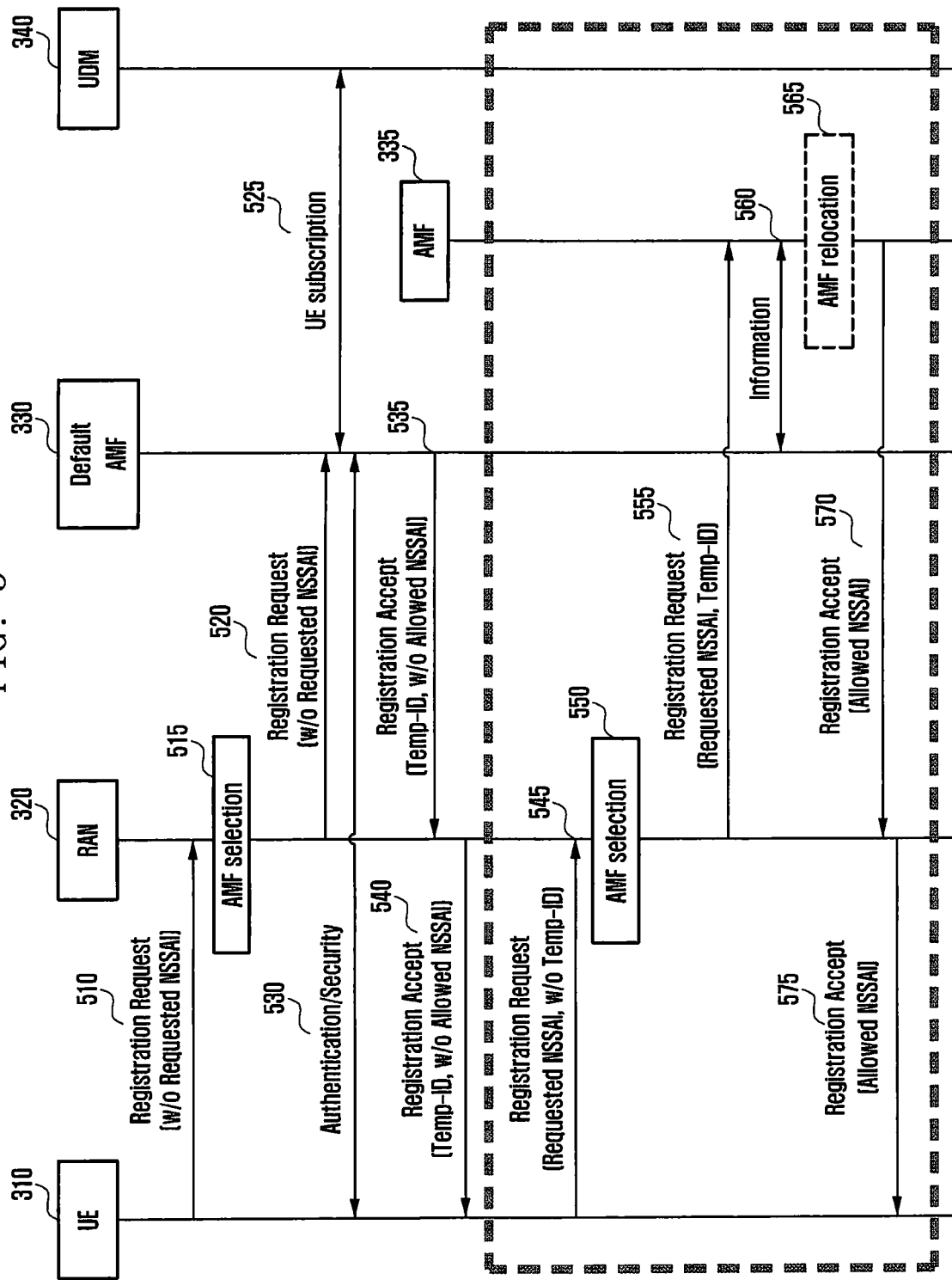
FIG. 5 is a diagram illustrating a two-operation registration procedure that does not include a temporary ID according to an embodiment.

FIG. 5 is a diagram illustrating a method of ensuring the security of slice information using a two-operation registration procedure. That is, operations 510 to 540 are the same as operations 350 to 380 described with reference to FIG. 3. Through this process, in operation 530, the terminal 310 that has performed security setup transmits the registration request message to the RAN 320 in operation 545 and includes the requested NSSAI. However, in FIG. 5, the Temp-ID allocated in the previous registration process is included only in the NAS message, but is not included in an RRC message. The requested NSSAI is included in both NAS and RRC messages. The NAS message is a message transmitted from the terminal 310 to the AMF 330, and the RRC message is a message transmitted from the terminal 310 to the RAN 320. In operation 550, the RAN 320 selects the AMF 335 based on the requested NSSAI without the Temp-ID (since the terminal 310 does not include the Temp-ID in the RRC message in operation 545) and forwards the corresponding message. That is, the AMF 335 that has received the registration request message in operation 555 may be different from the existing default AMF 330. The AMF 335 that has received the message at operation 555 identifies the default AMF 330 previously connected to the terminal 310 based on the Temp-ID included in the registration request message (since the terminal 310 includes the Temp-ID in the NAS message in operation 545), and obtains UE context-related information from the default AMF 330 in operation 560. In operation 555, the AMF 335 that has received the requested NSSAI acquires the allowed NSSAI. As to a method of determining the allowed NSSAI, the allowed NSSAI may be determined based on the requested NSSAI received from the terminal 310, subscriber information of the terminal 310, the policy of the mobile communication operator, and slice information available at the current terminal location. A network function for determining the allowed NSSAI may be performed by the AMFs 330 and 335, a NSSF, or a NRF. If the NSSF or the NRF determines the allowed NSSAI, the AMF 335 communicates with the NSSF or the NRF to obtain the allowed NSSAI information after operation 560. The AMF 335 itself that has acquired the allowed NSSAI determines whether to support S-NSSAIs included in the allowed NSSAI, and forwards the corresponding message to another AMF (not shown) that can support the S-NSSAIs included in the allowed NSSAI in operation 565 when the S-NSSAIs cannot be supported. When the current AMF (default AMF) 335 can support the S-NSSAIs included in the allowed NSSAI, operation 565 is not performed. In operations 570 and 575, the AMF 335 transmits a registration acceptance message for informing the terminal 310 of successful registration, and the allowed NSSAI is included in the corresponding message. If the new AMF 335 allocates a new Temp-ID to the terminal 310, Temp-IDs newly assigned in operations 570 and 575 may be also included and transmitted.

Figure 6:
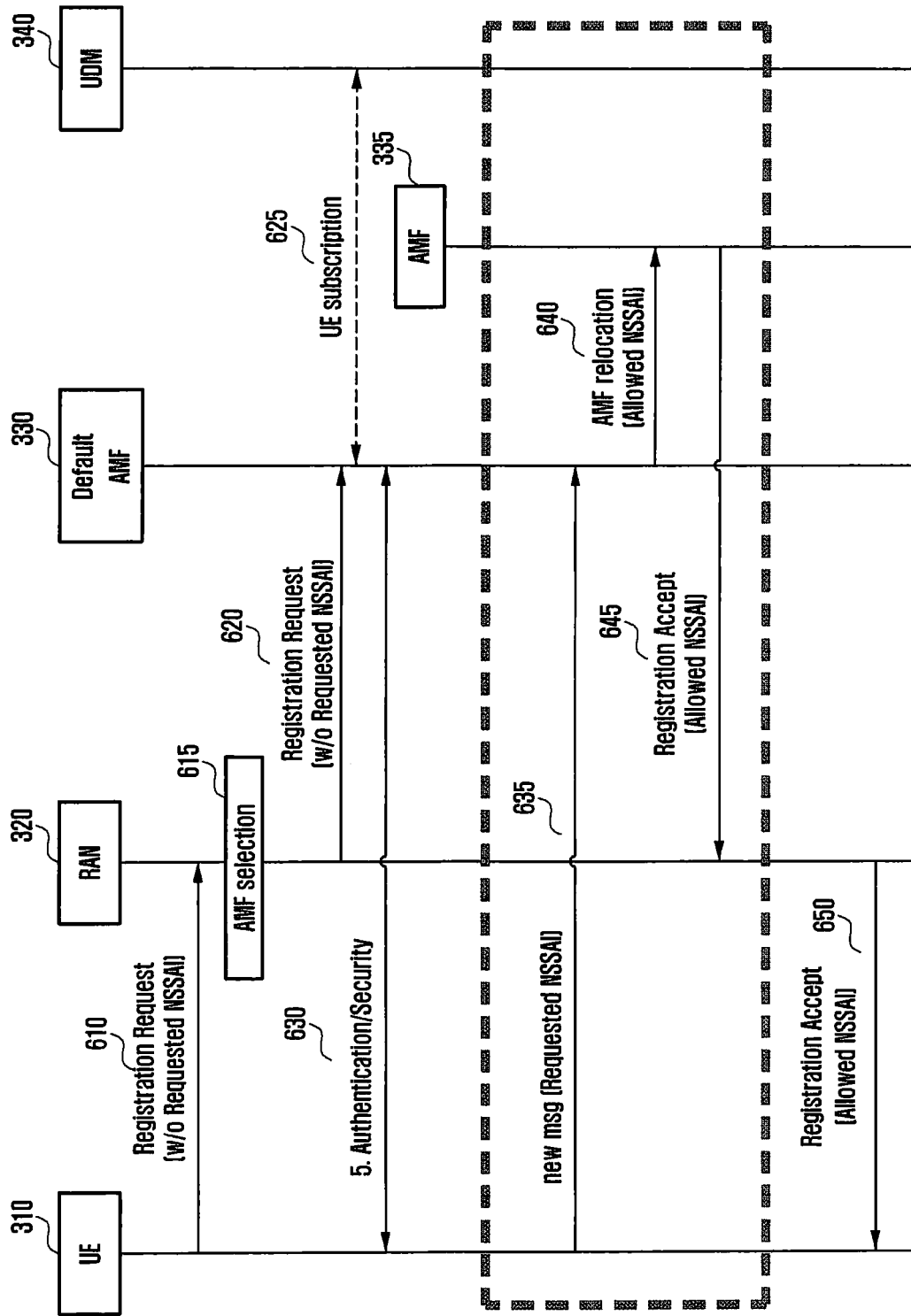
FIG. 6 is a diagram illustrating a one-operation registration procedure according to an embodiment.

FIG. 6 is a diagram illustrating a one-operation registration procedure according to an embodiment. Operations 610 to 630 are the same as operations 350 to 370 described with reference to FIG. 3. Since the messages transmitted after operation 630 are messages with guaranteed security, the terminal 310 which has performed security setup in operation 630 transmits a requested NSSAI to the AMF 330 in operation 635. At this time, operations 630 and 635 may not be performed simultaneously. That is, instead of transmitting an independent message to the AMF 330 as in operation 635, the terminal 310 may include the requested NSSAI during the security setup at operation 630 and transmits the requested NSSAI to the AMF 330. The AMF 330 that has received the requested NSSAI in operation 635 acquires the allowed NSSAI. As to a method of determining the allowed NSSAI, the allowed NSSAI may be determined based on the requested NSSAI received from the terminal 310, subscriber information of the terminal 310, the policy of the mobile operator, and slice information available at the current terminal location. A network function for determining the allowed NSSAI may be performed by the AMF 330, a NSSF, or a NRF. If the NSSF or the NRF determines the allowed NSSAI, the AMF 330 communicates with the NSSF or the NRF to obtain the allowed NSSAI information after operation 635. The AMF 330 itself that has acquired the allowed NSSAI determines whether to support S-NSSAIs included in the allowed NSSAI, and forwards the corresponding message to another AMF 335 that can support the S-NSSAIs included in the allowed NSSAI in operation 640 when the S-NSSAIs cannot be supported. When the current AMF (default AMF) 330 can support the S-NSSAIs included in the allowed NSSAI, operation 640 is not performed, and a message at operation 645 is transmitted to the default AMF 330. In operations 645 and 650, the AMFs 330 and 335 transmit a registration acceptance message for informing the terminal 310 of successful registration, and the allowed NSSAI is included in the corresponding message. If the new AMF 335 allocates a new Temp-ID to the terminal 310, Temp-IDs newly allocated in operations 645 and 650 may be also included and transmitted.

Figure 7:
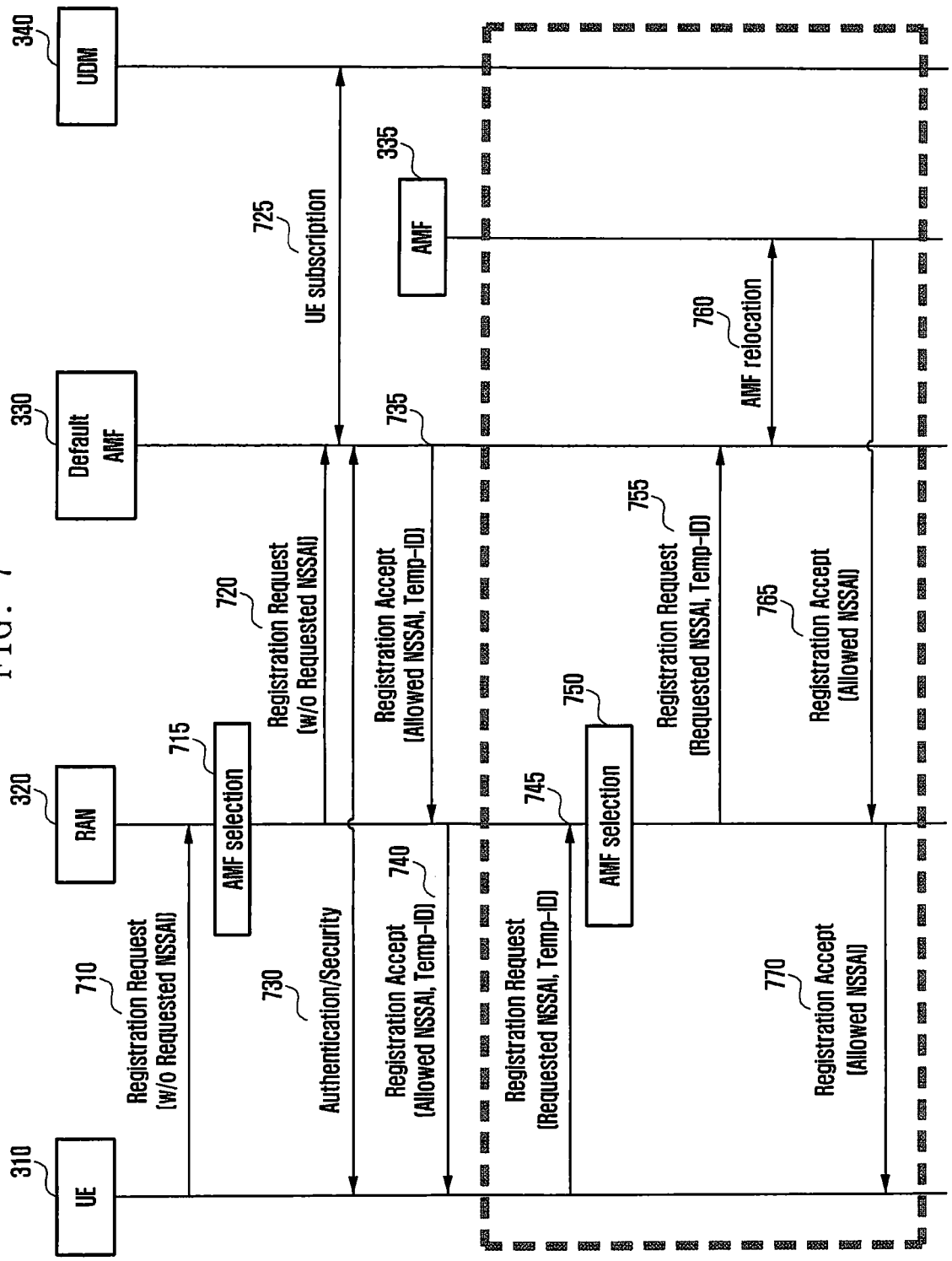
FIG. 7 is a diagram illustrating a two-operation registration procedure including a temporary ID for first transmitting an allowed NSSAI according to an embodiment.
Figure 8:
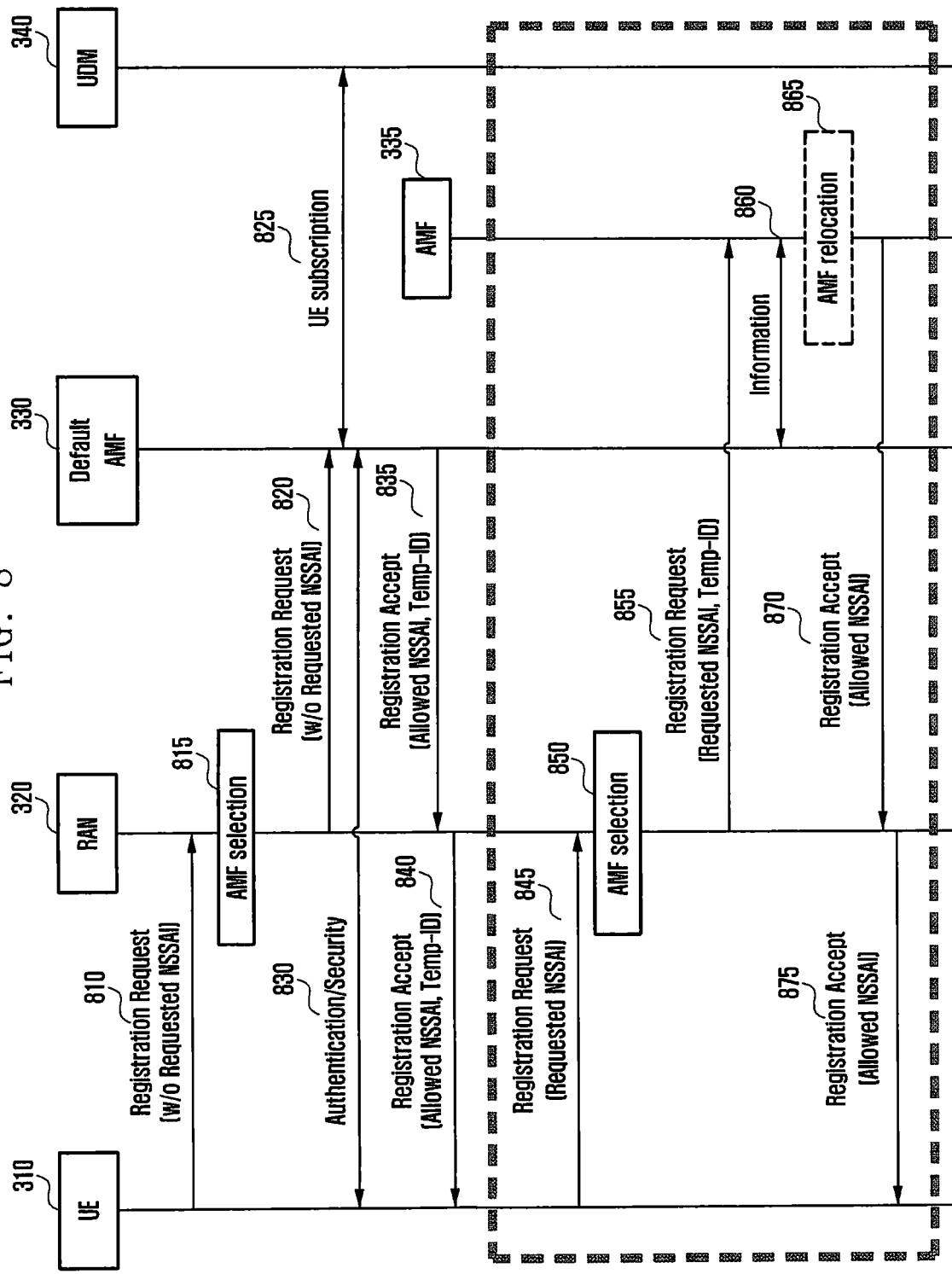
FIG. 8 is a diagram illustrating a two-operation registration procedure that does not include a temporary ID for first transmitting an allowed NSSAI according to an embodiment.
Figure 9:
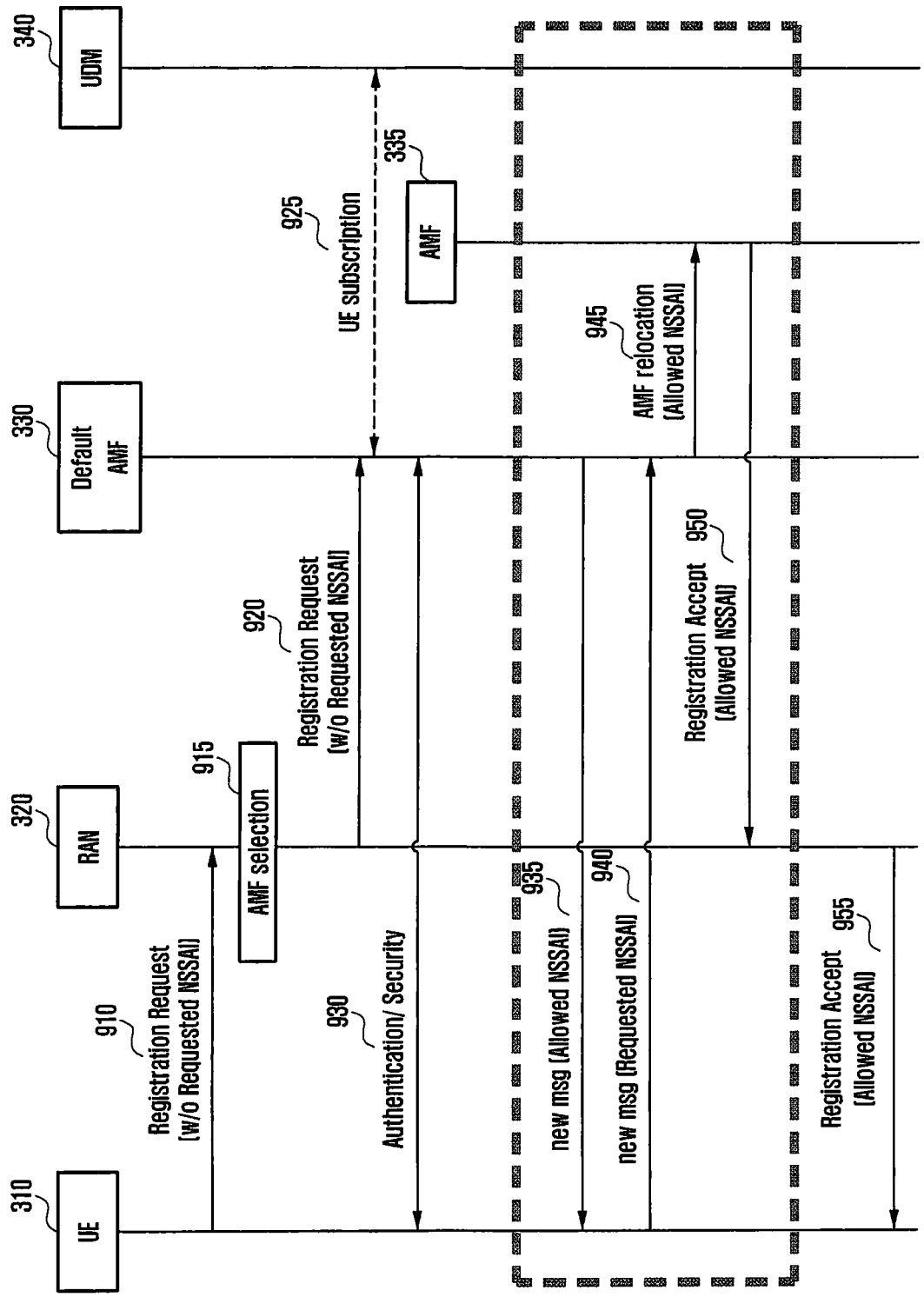
FIG. 9 is a diagram illustrating a one-operation registration procedure for first transmitting allowed NSSAI according to an embodiment.

FIGS. 3 to 6 illustrate a method in which, when the terminal 310 first transmits the requested NSSAI, a network (the AMFs 330 and 335, the NSSF, or the NRF) generates the allowed NSSAI based on the requested NSSAI and transmits the generated allowed NSSAI to the terminal 310. FIGS. 7 to 9 illustrate a method in which a network first transmits the allowed NSSAI including slice information available at the location of the current terminal 310 to the terminal 310, and the terminal 310 selects S-NSSAIs to be used among the allowed NSSAIs and transmits the selected S-NSSAIs to the requested NSSAI.

FIG. 7 illustrates a method of ensuring the security of slice information using a two-operation registration procedure. Operations 710 to 730 are the same as operations 350 to 370 described with FIG. 3. Before transmitting the registration acceptance message to the terminal 310 after operation 730, the AMF 330 acquires the allowed NSSAI. As to a method of determining the allowed NSSAI, the allowed NSSAI may be determined based on subscriber information of the terminal 310, the policy of the mobile operator, and slice information available at the current terminal location. A network function for determining the allowed NSSAI may be performed by the AMF 330, a NSSF, or a NRF. When the NSSF or the NRF determines the allowed NSSAI, the AMF 330 communicates with the NSSF or the NRF to obtain the allowed NSSAI information, after operation 730. The AMF 330 allocates a temporary ID or a Temp-ID, which is a temporary identifier used by the terminal 310 to access a network. The AMF 330 may transmit a registration acceptance message allowing the registration of the terminal 310 to the terminal 310 through operations 735 and 740, and may include allowed NSSAI information and the Temp-ID in the registration acceptance message. The terminal 310 that has received a message in operation 740 selects a slice to be used among the allowed NSSAIs which are slice information available in the current network and produces the requested NSSAI. In operation 745, the terminal 310 transmits the registration request message to the RAN 320 and includes the requested NSSAI. At this time, the Temp-ID allocated during the previous registration process is included. In operation 750, the RAN 320 selects the AMF 330 associated with the Temp-ID based on the Temp-ID and forwards the corresponding message. In operation 755, the AMF 330 that has received the requested NSSAI may authenticate whether the terminal 310 can use the corresponding slice. The AMF 330 itself determines whether to support S-NSSAIs included in the slice to be used by the terminal 310, and forwards the corresponding message to the AMF 335 that can support the corresponding S-NSSAIs through in operation 760 when the S-NSSAIs cannot be supported. When the current AMF 330 (default AMF) can support the corresponding S-NSSAIs, operation 760 is not performed and the message at operation 765 is transmitted by the default AMF 330. In operations 765 and 770, the AMFs 330 and 335 transmit a registration acceptance message for informing the terminal 310 of successful registration, and the allowed NSSAI may be included in the corresponding message, if necessary. When the new AMF 335 allocated a new Temp-ID to the terminal, the Temp-IDs newly allocated in operations 765 and 770 may be included and transmitted.

FIG. 8 is similar to FIG. 7. However, a difference between FIGS. 7 and 8 is that the terminal 310 does not include the Temp-ID in the RRC message in operation 845, so that the RAN 320 selects the AMF 335 based on the requested NSSAI in operation 950 and forwards a message at operation 855 to the selected AMF 335. That is, the AMF 335 that has received the registration request message in operation 855 may be different from the existing default AMF 330. The AMF 335 that has received the message at operation 855 identifies the default AMF 330 previously connected to the terminal 310 based on the Temp-ID included in the registration request message (since the terminal 310 includes the Temp-ID in the NAS message in 845, and obtains UE context-related information from the default AMF 330 in operation 860. In operation 855, the AMF 335 that has the requested NSSAI may authenticate whether the terminal 310 can use the corresponding slice. The AMF 335 itself determines whether to support S-NSSAIs included in a slice to be used by the terminal, and forwards the corresponding message to another AMF (not shown) that can support the corresponding S-NSSAIs in operation 865 when the S-NSSAIs cannot be supported. When the current AMF 335 (default AMF) can support the corresponding S-NSSAIs, operation 865 is not performed and the message at operation 870 is transmitted by the default AMF 335. In operations 870 and 875, the AMF 335 transmits a registration acceptance message for informing the terminal 310 of successful registration, and the allowed NSSAI may be included in the corresponding message, if necessary. When the new AMF 335 allocated a new Temp-ID to the terminal 310, the Temp-IDs newly allocated in operations 870 and 875 may be included and transmitted.

FIG. 9 illustrates a method of ensuring the security of slice information using a one-operation registration procedure. Operations 910 to 930 are the same as operations 610 to 630 described with reference to FIG. 6. A message transmitted by the terminal 310, which has performed security setup in operation 930, after operation 930 is a message with guaranteed security. After operation 930, the AMF 330 acquires an allowed NSSAI. As to a method of the allowed NSSAI, the allowed NSSAI may be determined based on subscriber information of the terminal 310, the policy of the mobile operator, and slice information available at the current terminal location. A network function for determining the allowed NSSAI may be performed by the AMF 330, a NSSF, or a NRF. If the NSSF or the NRF determines the allowed NSSAI, the AMF 310 communicates with the NSSF or the NRF to obtain the allowed NSSAI information after operation 930. In operation 935, the AMF 330 transmits the allowed NSSAI to the terminal 310. The terminal 310 that has received the allowed NSSAI selects a slice to be used among the allowed NSSAIs which are slice information available in the current network and produces the requested NSSAI. In operation 940, the terminal 310 transmits the requested NSSAI to the AMF 330. The AMF 330 that has received the requested NSSAI may authenticate whether the terminal 310 can use the corresponding slice. The AMF 330 itself determines whether to support S-NSSAIs included in the slice to be used by the terminal, and forwards the corresponding message to another AMF 335 that can support the corresponding S-NSSAIs through in operation 945 when the S-NSSAIs cannot be supported. When the current AMF 330 (default AMF) can support the corresponding S-NSSAIs, operation 945 is not performed and the message at operation 950 is transmitted by the default AMF 330. In operations 950 and 955, the AMFs 330 and 335 transmit a registration acceptance message for informing the terminal 310 of successful registration, and the allowed NSSAI may be included in the corresponding message, if necessary. When the new AMF 335 allocated a new Temp-ID to the terminal 310, the Temp-IDs newly allocated in operations 950 and 955 may be included and transmitted.

The requested NSSAI or the allowed NSSAI consists of a list of the S-NSSAIs. The S-NSSAI refers to a specific slice.

Third Embodiment

Figure 10:
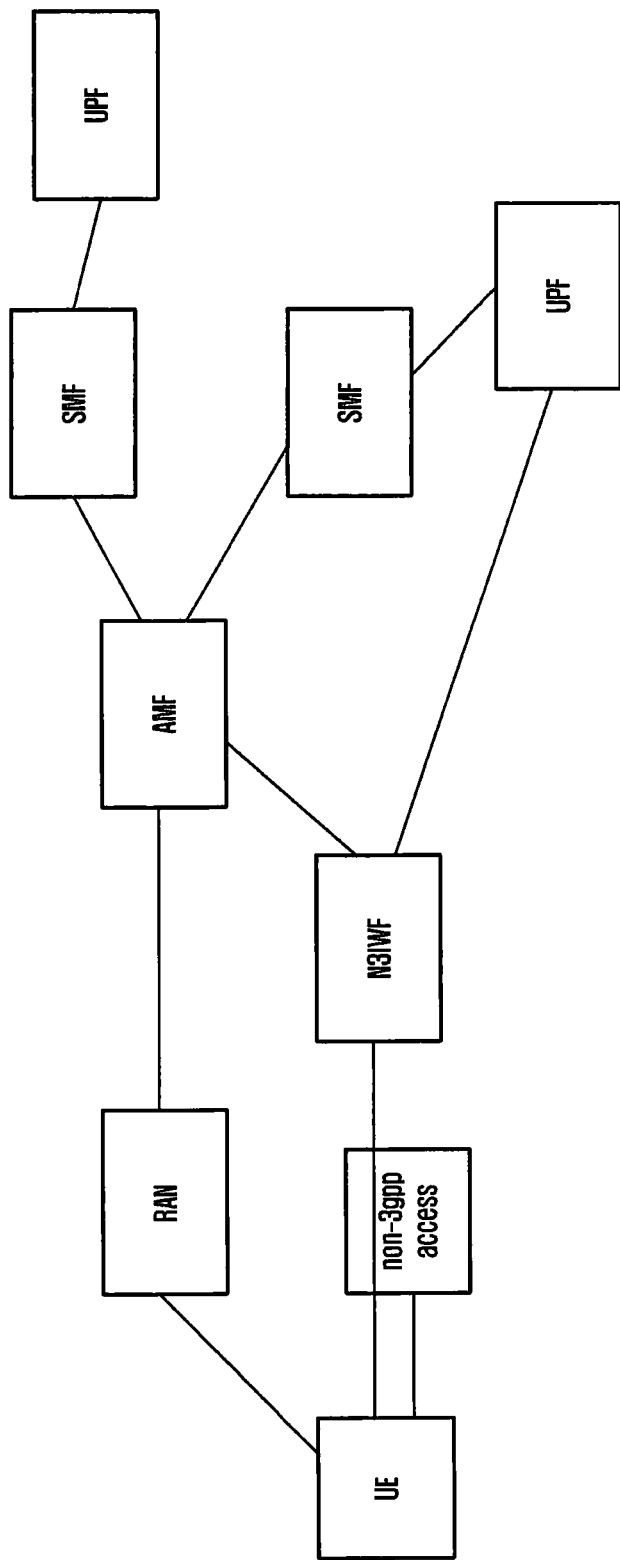
FIG. 10 illustrates an example of a structure in which a terminal is connected to a 5G network through 3gpp access and non-3gpp access according to an embodiment.

FIG. 10 illustrates an example of a structure in which a terminal is connected to a 5G network through non-3gpp access according to an embodiment. In particular, FIG. 3 illustrates an example of a structure in which a terminal is connected to a 5G network through 3gpp access and non-3gpp access and also includes a structure using a common AMF.

Referring to FIG. 10, when a terminal is connected to a 5G core network through 3gpp access, that is, a 5G RAN, and at the same time the terminal is connected to the 5G core network through non-3gpp access, a common AMF is selected. The terminal is connected to the 5G core network through each of 3gpp access and non-3gpp access, and the AMF separately manages the 3gpp and non-3gpp.

Here, N3IWF is a 5G core network device that is defined for smooth interworking between the non-3gpp access and the 5G core network. The N3IWF is also called ngPDG as an entity that serves to forward NAS messages or data transmitted and received through non-3gpp access. The SMF is an entity that manages sessions and assigns an IP address to a terminal, and the UPF serves to forward user data under the control of the SMF.

According to an embodiment, when the AMF performs registration management for non-3GP access, a method in which the corresponding terminal manages PDU sessions for non-3gpp access may vary depending on whether the corresponding terminal is registered through 3gpp access.

For example, in a case in which the corresponding terminal is registered through 3gpp access or non-3GP access, when NW triggered deregistration is performed on the non-3gpp access of the terminal, handover from a PDU session that is determined that the terminal can service even in 3gpp access among PDU sessions for non-3gpp access, to 3gpp access is performed, so that possible PDU sessions can be serviced continuously through 3gpp access even if non-3gpp access is deregistered. As a result, the terminal and the 5G core network can efficiently perform resource management. In particular, the method in which the corresponding terminal manages PDU sessions for non-3gpp access may include a case in which the terminal performs NW triggered deregistration on the non-3gpp access even in a situation in which the terminal is in a CM-IDLE for non-3gpp access. In addition, in the embodiment, deregistration for non-3gpp access is described mainly, but a procedure for deregistration for 3gpp access can be applied to a method of managing the PDU sessions for 3gpp access through the same method.

Figure 11:
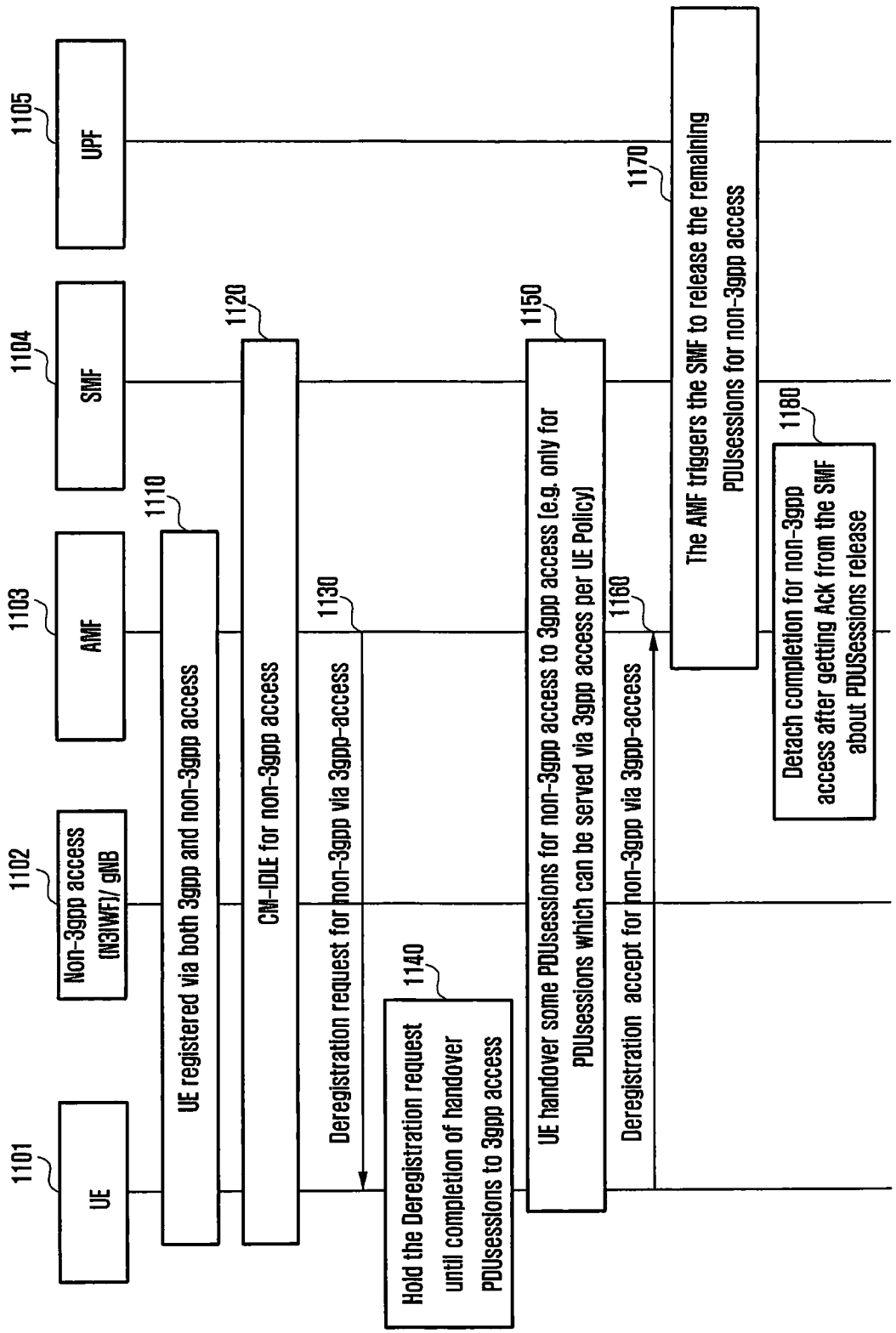
FIG. 11 illustrates a process in which, when a terminal connected to a 5G network through 3gpp access and non-3gpp access according to an embodiment cannot use the non-3gpp access, the terminal locally releases a PDU session of the non-3gpp access or locally deregisters the non-3gpp.

FIG. 11 illustrates a process in which, in a situation where a terminal connected to a 5G network through 3gpp access and non-3gpp access according to an embodiment is in a CM-IDLE for non-3gpp access, the terminal performs NW triggered deregistration for non-3gpp access.

In operation 1110, a terminal 1101 that has successfully performed registration in a 5G through 3gpp access and non-3gpp access uses a PDU session produced through non-3gpp access.

At this time, for various reasons such that the terminal 1101 is out of coverage of the non-3gpp access, non-3gpp access is disabled such as a non-3gpp access module being turned off, a secure connection between the terminal 1101 and the N3IWF 1102 is lost, and the like, the terminal 1101 enters a CM-IDLE mode for the non-3gpp access in operation 1120. In this situation, the 5G network, for example, the AMF 1103 may trigger NW triggered deregistration for non-3gpp access of the terminal 1101. For example, in a situation in which a deregistration timer for non-3gpp access expires or registration for non-3gpp access is disabled due to a change in the subscription of the terminal 1101, the AMF 1103 performs NW triggered deregistration. At this time, since the non-3gpp access is in the CM-IDLE mode, the AMF 1101 transmits a deregistration request message for non-3gpp access for non-3gpp access to the terminal 1101 through 3gpp access in operation 1130.

In operation 1140, the terminal 1101 that has received the deregistration request message does not process the deregistration request message and waits until handover for PDU sessions that are movable to 3gpp access is completely performed among the PDU sessions for non-3gpp access.

In operation 1150, the terminal 1101 determines to perform handover to 3gpp access with respect to which PDU sessions among the PDU sessions produced for the existing non-3gpp access based on UE policy information, user configuration information, and the like, and performs a procedure for performing handover to 3gpp access with respect to the determined PDU sessions. As to the handover procedure, when performing handover with respect to the PDU session for non-3gpp, a data path is generated to be connected to a UPF 1105 through a gNB 1102 of 3gpp access while producing the PDU session using the same PDU session ID through 3gpp access, and a data path between an N3IWF 1102 of the existing non-3gpp access and the UPF 1105 is deleted if necessary.

The terminal 1101 that has completed the handover procedure processes the pending deregistration request message. That is, in operation 1160, PDU sessions which still remain as the PDU sessions for non-3gpp access are locally released, and a deregistration acceptance message for non-3gpp access that informs the AMF 1103 of deregistration is transmitted to the AMF 1103 through 3gpp access.

In operation 1170, the AMF 1103 that has received the deregistration acceptance message for non-3gpp access performs releasing with respect to the PDU session still remaining for the non-3gpp access, through the SMF 1104. In operation 1180, the AMF 1103 that has received ACK for the PDU session release from the SMF 1104 completes a de-registration process for the non-3gpp access of the terminal 1101.

The above embodiment corresponds to a case in which the terminal 1101 is in a CM-IDLE for the non-3gpp access, but even in a CM-CONNECTED situation, PDU session management and deregistration may be equally performed by performing NW triggered deregistration with respect to the non-3gpp access through the 3gpp access.

Figure 12:
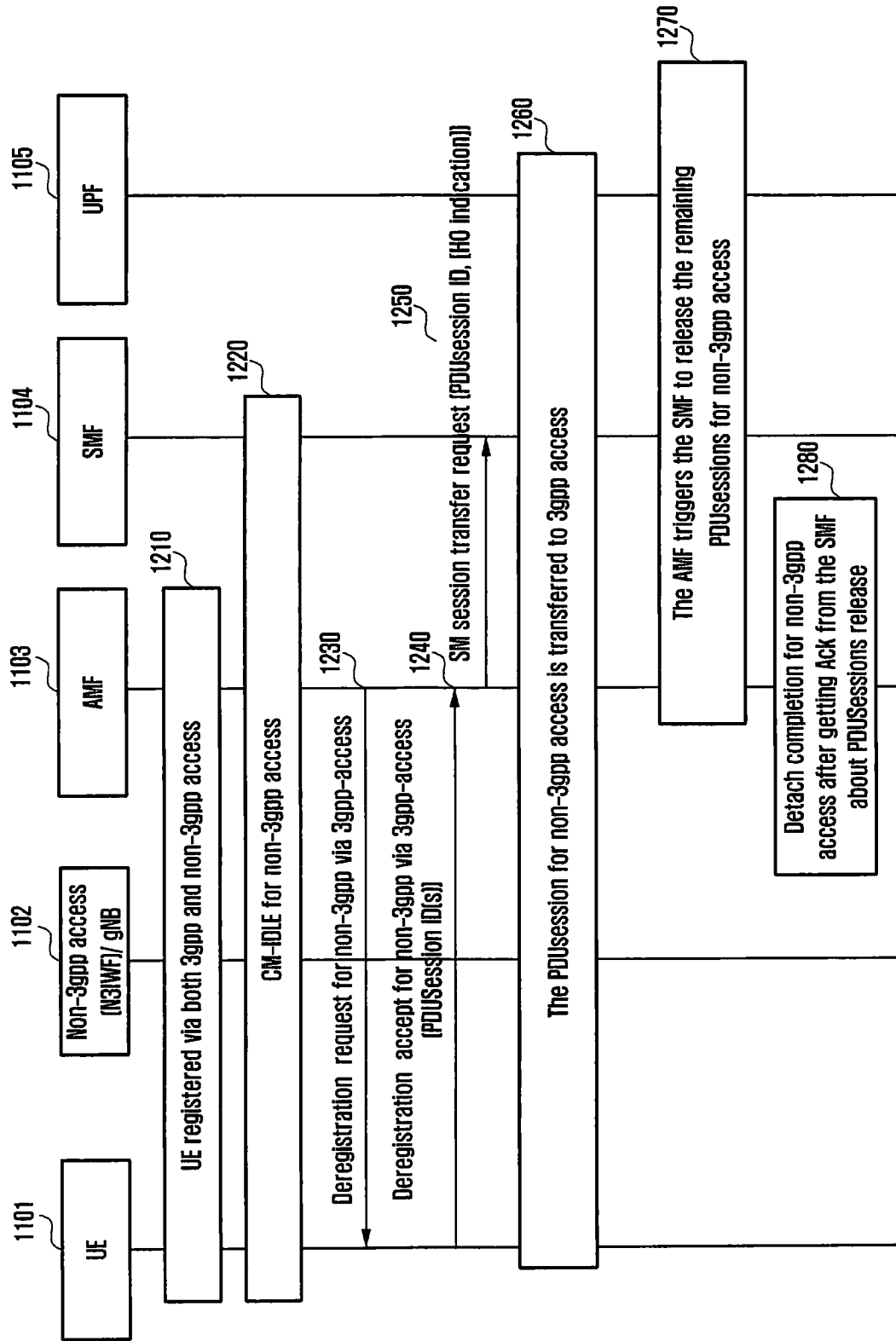
FIG. 12 illustrates a process in which, when a terminal connected to a 5G network through 3gpp access and non-3gpp access according to an embodiment cannot use the non-3gpp access, the terminal locally releases a PDU session of the non-3gpp access or deregisters the non-3gpp through the 3gpp access.

FIG. 12 illustrates a process of performing NW triggered deregistration on non-3gpp access in a situation where a terminal connected to a 5G network through 3gpp access and non-3gpp access according to an embodiment is in a CM-IDLE.

In operation 1210, the terminal 1101 that has successfully performed registration on a 5G network through 3gpp access and non-3gpp access uses a PDU session produced through the non-3gpp access.

At this time, in operation 1220, for various reasons such that the terminal 1101 is out of coverage of the non-3gpp access, non-3gpp access is disabled such as a non-3gpp access module being turned off, a secure connection between the terminal 1101 and the N3IWF 1102 is lost, and the like, the terminal 1101 enters a CM-IDLE mode for the non-3gpp access. In this situation, the 5G network, for example, the AMF 1103 may trigger NW triggered deregistration with respect to the non-3gpp access of the terminal 110. For example, in a situation in which a deregistration timer for non-3gpp access expires or registration for non-3gpp access is disabled due to a change in the subscription of the terminal 1101, the AMF 1103 performs NW triggered deregistration. At this time, since the non-3gpp access is in the CM-IDLE mode, the AMF 1103 transmits a deregistration request message for non-3gpp access to the terminal 1101 through 3gpp access in operation 1130.

In operation 1230, before processing the deregistration request message, the terminal 1101 that has received the deregistration request message selects PDU sessions that can be moved to 3gpp access among the PDU sessions for non-3gpp access, and internally moves the corresponding PDU sessions to 3gpp access in the terminal.

In the selection of the PDU sessions that can be moved to the 3gpp access, in operation 1240, the terminal 1101 determines whether to perform handover to 3gpp access with respect to which PDU sessions among the PDU sessions produced for the existing non-3gpp access based on UE policy information, user configuration information, and the like, internally moves the PDU sessions to the 3gpp access in the terminal, and transmits a deregistration acceptance message for the non-3gpp access including PDU session IDs of the PDU sessions moved to the 3gpp access to the AMF 1103 through the 3gpp access.

Meanwhile, in operation 1250, the AMF 1103 that has received the deregistration acceptance message including the PDU session IDs transmits, to the SMF 1104, a session transfer request message while including the session transfer request message in the PDU session ID, in order to move the PDU sessions for the PDU session IDs to the 3gpp access. At this time, the request message may include a handover indication indicating that the session transfer is handovered from non-3gpp access to 3gpp access.

In operation 1260, the SMF 1104 that has received the request performs a procedure for moving the corresponding PDU session to the 3gpp access. To this end, a data path is produced to be connected to the UPF 1105 through the gNB 1102 of the 3gpp access with respect to the existing PDU session, and a data path between the N3IWF 1102 of the existing non-3gpp access and the UPF 1105 is deleted, if necessary.

Meanwhile, in operation 1270, releasing is performed with respect to the PDU sessions for the PDU session IDs that are not included in the deregistration acceptance message through the SMF 1104. In operation 1280, the AMF 1103 that has received ACK for the PDU session release from the SMF 1104 completes a de-registration process for the non-3gpp access of the terminal 1101.

The above embodiment corresponds to a case in which the terminal 1101 is in the CM-IDLE for the non-3gpp access, but even in a CM-CONNECTED situation, PDU session management and deregistration may be equally performed by performing NW triggered deregistration with respect to the non-3gpp access through the 3gpp access.

Figure 13:
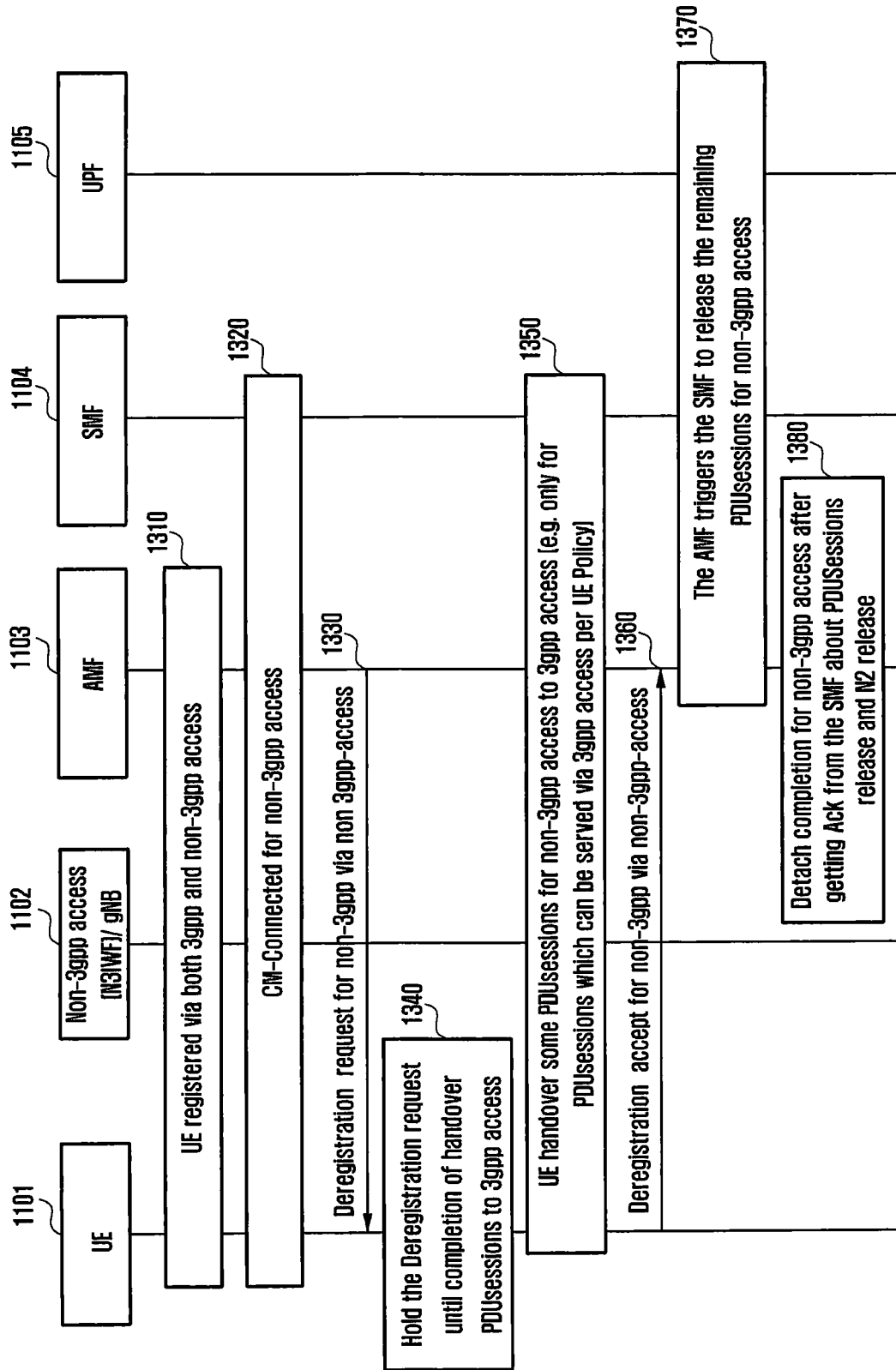
FIG. 13 illustrates a process in which, when a terminal connected to a 5G network through 3gpp access and non-3gpp access according to an embodiment cannot use the non-3gpp access, the terminal transfers a PDU session of the non-3gpp access to the 3gpp access through the 3gpp access.

FIG. 13 illustrates a process of performing NW triggered deregistration for non-3gpp access with respect to a terminal of a connected mode connected to a 5G network through 3gpp access and non-3gpp access according to an embodiment.

In operation 1310, the terminal 1101 that has successfully performed registration on a 5G network through 3gpp access and non-3gpp access uses a PDU session produced through the non-3gpp access.

The 5G network, for example, the AMF 1103 may trigger NW triggered deregistration for the non-3gpp access of the terminal 1101, with respect to the terminal 1101 that is in the connected mode for the non-GPP access. For example, due to a situation in which registration for non-3gpp access is impossible due to a change in the subscription of the terminal 1101, or the like, the AMF 1103 performs NW triggered deregistration. At this time, in operation 1330, the AMF 1103 transmits, to the terminal 1101, a deregistration request message for the non-3gpp access through the non-3gpp access (1330 operation).

In operation 1340, the terminal 1101 that has received the deregistration request message does not process the deregistration request message, and waits until handover for the PDU sessions that can be moved to the 3gpp access among the PDU sessions for the non-3gpp access is completed.

In operation 1350, the terminal 1101 determines to perform handover to 3gpp access with respect to which PDU sessions among the PDU sessions produced for the existing non-3gpp access based on UE policy information, user configuration information, and the like, and performs a procedure for performing handover to 3gpp access with respect to the determined PDU sessions. As to the handover procedure, when performing handover with respect to the PDU session for non-3gpp, a data path is generated to be connected to a UPF 1105 through a gNB 1102 of 3gpp access while producing a PDU session using the same PDU session ID through 3gpp access, and a data path between an N3IWF 1102 of the existing non-3gpp access and the UPF 1105 is deleted.

The terminal 1101 that has completed the handover procedure processes the pending deregistration request message. That is, in operation 1360, PDU sessions which still remain as the PDU sessions for non-3gpp access are locally released, and a deregistration acceptance message for non-3gpp access that informs the AMF 1103 of deregistration is transmitted to the AMF 1103 through 3gpp access.

In operation 1370, the AMF 1103 that has received the deregistration acceptance message for the non-3gpp access performs releasing with respect to the PDU sessions still remaining for the non-3gpp access, through the SMF 1104. In operation 1380, the AMF 1103 that has received ACK for the PDU session release from the SMF 1104 completes a de-registration process for the non-3gpp access of the terminal 1101.

Figure 14:
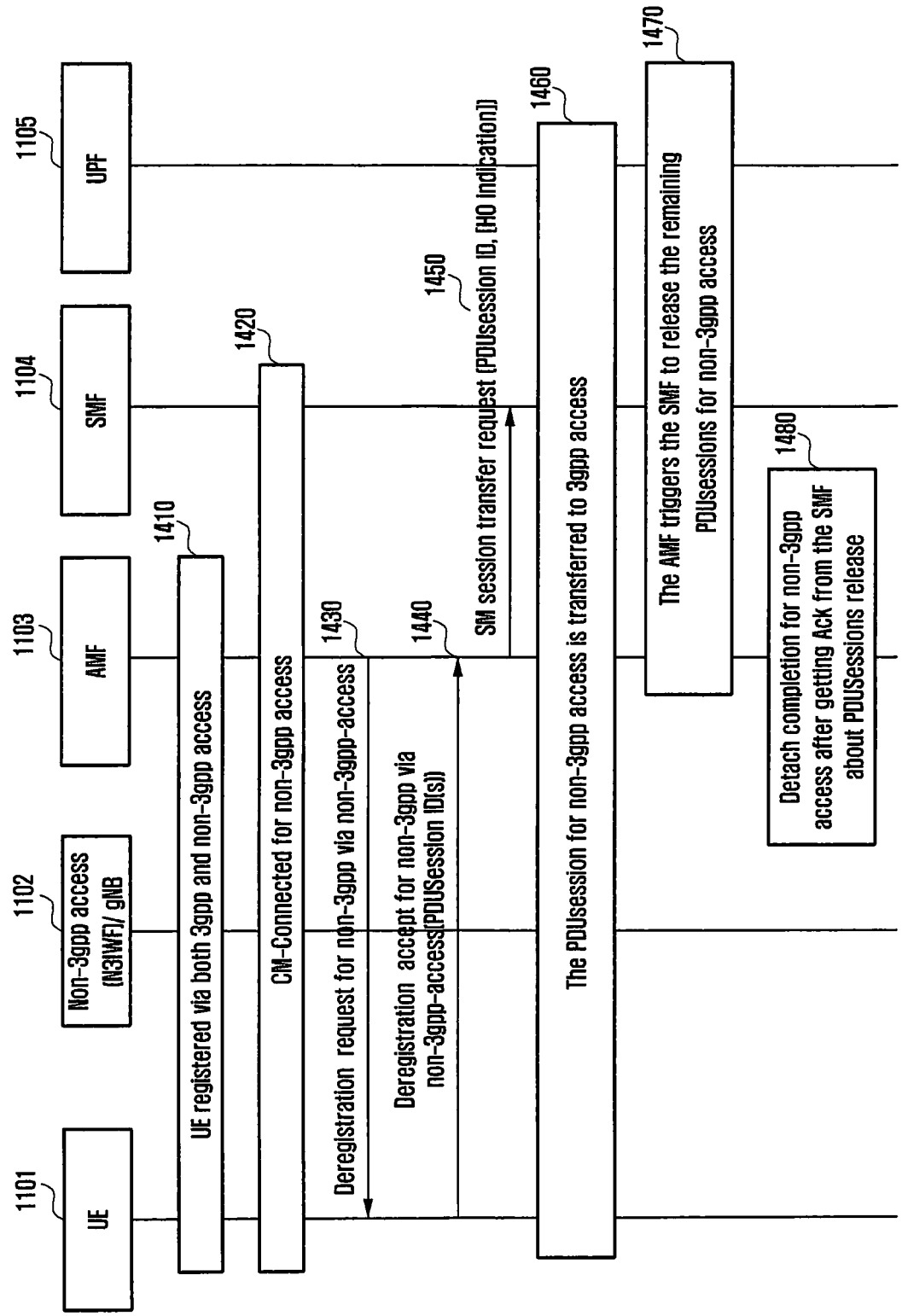
FIG. 14 illustrates a process in which, when an AMF recognizes, through N3IWF, that a terminal connected to a 5G network through 3gpp access and non-3gpp access according to an embodiment cannot use the non-3gpp access, the terminal releases a PDU session of the non-3gpp access or deregisters the non-3gpp through the 3gpp access.

FIG. 14 illustrates a process in which a terminal connected to a 5G network through 3gpp access and non-3gpp access performs NW triggered deregistration for non-3gpp access in a CM-connected situation for non-3gpp access.

In operation 1410, the terminal 1101 that has successfully performed registration on a 5G network through 3gpp access and non-3gpp access uses a PDU session produced through the non-3gpp access.

The 5G network, for example, the AMF 1103 may trigger NW triggered deregistration for non-3gpp access of the terminal 1101 with respect to the terminal 1101 that is in the connected mode. For example, due to a situation in which registration for non-3gpp access is impossible due to a change in the subscription of the terminal 1101, or the like, the AMF 1103 performs NW triggered deregistration. At this time, in operation 1430, the AMF 1103 transmits, to the terminal 1101, a deregistration request message for the non-3gpp access through the non-3gpp access.

In operation 1430, before processing the deregistration request message, the terminal 1101 that has received the deregistration request message selects the PDU sessions that can move to the 3gpp access among the PDU sessions for the non-3gpp access, and internally moves the corresponding PDU sessions to the 3gpp access inside the terminal.

In the selection of the PDU sessions that can be moved to the 3gpp access, in operation 1440, the terminal 1101 determines whether to perform handover to 3gpp access with respect to which PDU sessions among the PDU sessions produced for the existing non-3gpp access based on UE policy information, user configuration information, and the like, internally moves the PDU sessions to the 3gpp access in the terminal, and transmits a deregistration acceptance message for the non-3gpp access including PDU session IDs of the PDU sessions moved to the 3gpp access to the AMF 1103 through the 3gpp access.

Meanwhile, in operation 1450, the AMF 1103 that has received the deregistration acceptance message including the PDU session IDs transmits, to the SMF 1104, a session transfer request message while including the session transfer request message in the PDU session ID, in order to move the PDU sessions for the PDU session IDs to the 3gpp access. At this time, the request message may include a handover indication indicating that the session transfer is handovered from non-3gpp access to 3gpp access.

In operation 1460, the SMF 1104 that has received the request performs a procedure of moving the corresponding PDU session to the 3gpp access. To this end, a data path is produced to be connected to the UPF 1105 through the gNB 1102 of the 3gpp access with respect to the existing PDU session, and a data path between the N3IWF 1102 of the existing non-3gpp access and the UPF 1105 is deleted.

Meanwhile, in operation 1470, releasing is performed with respect to the PDU sessions for the PDU session IDs that are not included in the deregistration acceptance message through the SMF 1104. The AMF 1103 that has received ACK for the PDU session release from the SMF 1104 completes a de-registration process for the non-3gpp access of the terminal 1101.

Figure 15:
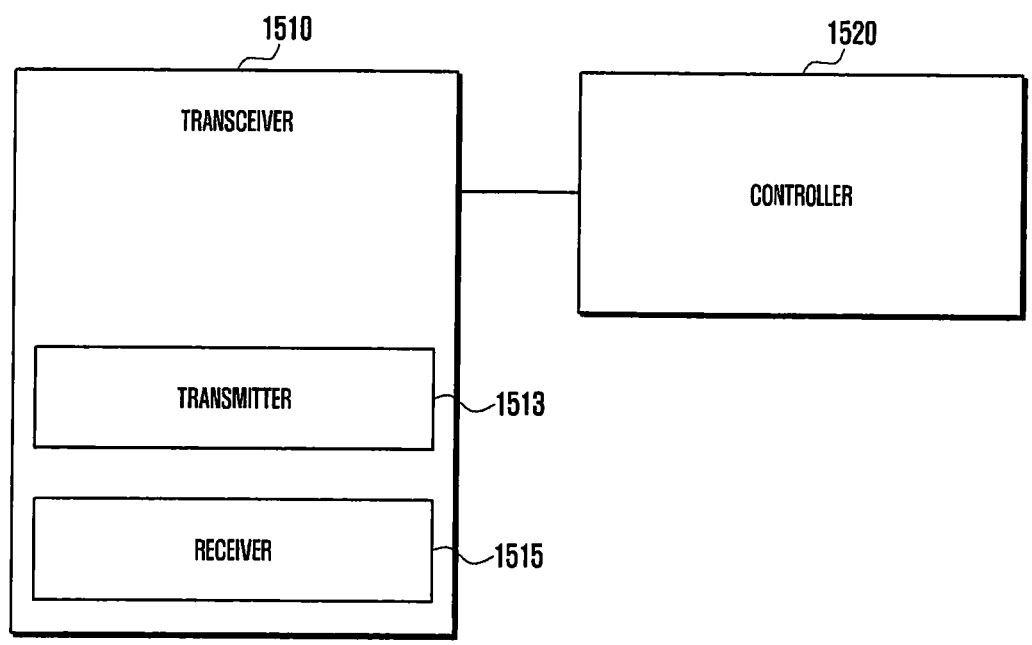
FIG. 15 is a diagram illustrating a configuration of a terminal according to an embodiment.

FIG. 15 is a diagram illustrating a configuration of a terminal according to an embodiment.

The terminal according to an embodiment may include a transceiver 1510 and a controller 1520 that controls the overall operation of the terminal. The transceiver 1510 may include a transmitter 1513 and a receiver 1515.

The transceiver 1510 may transmit and receive signals to and from other network entities.

The controller 1520 may control the terminal to perform any one of the above-described embodiments.

Meanwhile, the controller 1520 and the transceiver 1510 are not necessarily implemented as separate modules, but may be implemented as a single component in the form of a single chip. The controller 1520 and the transceiver 1510 may be electrically connected to each other. For example, the controller 1520 may be a circuit, an application-specific circuit, or at least one processor. In addition, the operations of the terminal can be realized by providing a memory device storing the corresponding program code to any component in the terminal.

Figure 16:
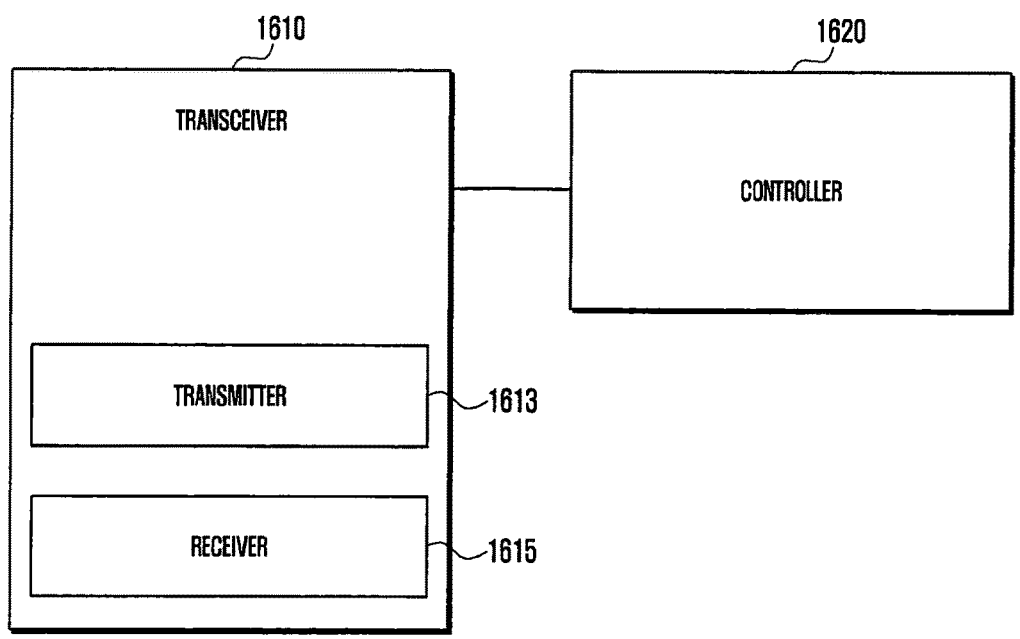
FIG. 16 is a diagram illustrating a configuration of an SMF according to an embodiment.

FIG. 16 is a diagram illustrating a configuration of an SMF according to an embodiment.

The SMF according to an embodiment may include a transceiver 1620 and a controller 1620 for controlling the overall operations of the SMF. The transceiver 1610 may include a transmitter 1613 and a receiver 1615.

The transceiver 1610 may transmit and receive signals with other network entities.

The controller 1620 may control the SMF to perform the operation of any one of the above-described embodiments.

Meanwhile, the controller 1620 and the transceiver 1610 are not necessarily implemented as separate modules, but may be implemented as a single component in the form of a single chip. The controller 1620 and the transceiver 1610 may be electrically connected to each other. For example, the controller 1710 may be a circuit, an application-specific circuit, or at least one processor. Also, the operations of the base station can be realized by providing a memory device storing the corresponding program code to any component in the base station.

In addition, although not shown, the network entity such as the base station (RAN, gNB, eNB), AMF, UPF, N3IWF, HSS, NEF, PCF, AF, or the like according to an embodiment may include a transceiver and a controller that controls the overall operation of the network entity. In addition, the transceiver may include a transmitter and a receiver, and may transmit/receive a signal to and from other network entities. The controller may control the network entity to perform any one of the above-described embodiments, and the controller may be electrically connected to the transceiver.

In the above-described detailed embodiments of the disclosure, a component included in the disclosure is expressed in the singular or the plural according to a presented detailed embodiment. However, the singular or plural expressions are selected to be suitable for proposed situations for convenience of description, and the disclosure is not limited to the singular or plural elements. An element expressed in a plural form may be configured in singular, or an element expressed in a singular form may be configured in plural.

Although the embodiment has been described in the detailed description of the disclosure, the disclosure may be modified in various forms without departing from the scope of the disclosure. Therefore, the scope of the disclosure should not be defined as being limited to the embodiments, but should be defined by the appended claims and equivalents thereof.

The invention claimed is:

1. A method performed by a session management function (SMF) in a communication system, the method comprising:
receiving, from a user plane function (UPF), information indicating occurrence of downlink data;
determining whether a terminal corresponding to the downlink data is a mobile initiated communication only (MICO) mode terminal;
determining a buffering time to buffer the downlink data in case that the terminal is the MICO mode terminal; and transmitting, to at least one of an access and mobility management function (AMF) or the UPF, information on the buffering time.

2. The method of claim 1, wherein determining whether the terminal is the MICO mode terminal comprises
transmitting information about occurrence of the downlink data to the AMF,
receiving, from the AMF, at least one of information indicating that the terminal is the MICO mode terminal, and
determining whether the terminal is the MICO mode terminal, based on the information received from the AMF.

3. The method of claim 1, further comprising:
performing a connection activation procedure with the UPF and the terminal in case that the SMF receives, from the AMF, information indicating that the terminal is reachable according to a service request of the terminal before the buffering time expires.

4. The method of claim 1, further comprising:
receiving, from the AMF, information indicating that the terminal is reachable according to a service request of the terminal,
determining whether the buffering time expires, and
performing a connection activation procedure with the UPF and the terminal in case that the buffering time does not expire.

5. The method of claim 3, wherein performing the connection activation procedure with the UPF and the terminal comprises
transmitting, to the AMF, a message for session establishment including information indicating that the downlink data is pending.

6. A method performed by an access and mobility management function (AMF) in a communication system, the method comprising:
receiving, from a session management function (SMF), information indicating occurrence of downlink data;
determining whether a terminal corresponding to the downlink data is a mobile initiated communication only (MICO) mode terminal;
transmitting, to the SMF, information indicating that the terminal is the MICO mode terminal; and
receiving, from the SMF, information about a buffering time to buffer the downlink data.

7. The method of claim 6, further comprising:
receiving, from the terminal, a service request message;
determining whether the buffering time expires; and
transmitting, to the SMF, information indicating that the terminal is reachable in case that the buffering time does not expire.

8. The method of claim 7, further comprising:
receiving, from the SMF, a message for session establishment including information indicating that the downlink data is pending and
transmitting, to a base station, the information indicating that the downlink data is pending.

9. A session management function (SMF) in a communication system, the SMF comprising:
a transceiver; and
a controller configured to:
receive, from a user plane function (UPF) via the transceiver, information indicating occurrence of downlink data,
determine whether a terminal corresponding to the downlink data is a mobile initiated communication only (MICO) mode terminal,
determine a buffering time to buffer the downlink data in case that the terminal is the MICO mode terminal, and
transmit, to at least one of an access and mobility management function (AMF) and the UPF, information on the buffering time.

10. The SMF of claim 9, wherein the controller is further configured to transmit, to the AMF via the transceiver, the information indicating occurrence of the downlink data, receive, from the AMF via the transceiver, information indicating that the terminal is the MICO mode terminal, and determine whether the terminal is the MICO mode terminal based on the information received from the AMF.

11. The SMF of claim 9, wherein the controller is further configured to perform a connection activation procedure with the UPF and the terminal in case that the SMF receives, from the AMF, information indicating that the terminal is reachable according to a service request of the terminal before the buffering time expires.

12. The SMF of claim 9, wherein the controller is further configured to receive, from the AMF via the transceiver, information indicating that the terminal is reachable according to a service request of the terminal, determines whether the buffering time expires, and performs a connection activation procedure with the UPF and the terminal in case that the buffering time does not expire.

13. The SMF of claim 11, wherein the controller is further configured to transmit, to the AMF via the transceiver, a message for session establishment including information indicating that the downlink data is pending.

14. An access and mobility management function (AMF) in a communication system, the AMF comprising:
a transceiver; and
a controller configured to:
receive, from a session management function (SMF) via the transceiver, information indicating occurrence of downlink data,
determine whether a terminal corresponding to the downlink data is a mobile initiated communication only (MICO) mode terminal,
transmit, to the SMF via the transceiver, information indicating that the terminal is the MICO mode terminal, and
receive, from the SMF via the transceiver, information on a buffering time.

15. The AMF of claim 14, wherein the controller is further configured to receive, from the terminal via the transceiver, a service request message, determine whether the buffering time expires, transmit, to the SMF via the transceiver, information indicating that the terminal is reachable in case that the buffering time does not expire, and receive, from the SMF via the transceiver, a message for session establishment including information indicating that the downlink is pending.

* * * * *